(12) United States Patent
Wang et al.

(10) Patent No.: US 8,768,522 B2
(45) Date of Patent: Jul. 1, 2014

(54) SYSTEM AND METHOD FOR CONTROLLING SEMI-ACTIVE ACTUATORS

(75) Inventors: Yebin Wang, Acton, MA (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 19 days.

(21) Appl. No.: 13/471,312

(22) Filed: May 14, 2012

(65) Prior Publication Data

US 2013/0304262 A1 Nov. 14, 2013

(51) Int. Cl.

| G05B 21/00 | (2006.01) |
| G05B 13/02 | (2006.01) |
| B60G 17/018 | (2006.01) |
| G05D 1/00 | (2006.01) |
| B66B 1/36 | (2006.01) |
| B66B 1/34 | (2006.01) |

(52) U.S. Cl.
USPC ............. 700/280; 700/28; 700/32; 701/37; 701/48; 187/282; 187/391

(58) Field of Classification Search
CPC ............. B60G 2400/252; B60G 2500/10; B60G 2600/184; B60G 13/14; B60G 17/015; B60G 17/018; B60G 2202/24; B60G 2300/082; B60G 2400/25; B60G 2400/50; B60G 2600/16; B60G 2600/182; B60G 99/008; B60G 2202/25; B60G 2400/206; B60G 2600/09; B60G 2600/124; B60G 2600/1872; B60G 2600/1873; G05B 2219/39241; G05D 19/02; F16F 15/02; F16F 7/1005
USPC ......... 700/29, 32, 280; 187/292, 393; 701/37, 701/48; 702/54, 56
See application file for complete search history.

(56) References Cited

U.S. PATENT DOCUMENTS

| 4,881,172 | A | * | 11/1989 | Miller ............................. 701/37 |
| 5,289,902 | A | | 3/1994 | Fujita |
| 5,304,751 | A | * | 4/1994 | Skalski et al. ................ 187/393 |
| 5,712,783 | A | * | 1/1998 | Catanzarite .................... 701/37 |
| 5,824,975 | A | * | 10/1998 | Hong ............................ 187/292 |
| 5,896,949 | A | * | 4/1999 | Hamdy et al. ................ 187/292 |
| 6,311,110 | B1 | * | 10/2001 | Ivers et al. ..................... 701/37 |
| 6,752,425 | B2 | | 6/2004 | Loh |
| 7,314,119 | B2 | * | 1/2008 | Husmann et al. ............. 187/292 |

(Continued)

OTHER PUBLICATIONS

Hong et al., Vibration control of a frame structure using electro-rheological fluid mounts, 2002.*

(Continued)

*Primary Examiner* — Darrin Dunn
(74) *Attorney, Agent, or Firm* — Dirk Brinkman; Gene Vinokur

(57) ABSTRACT

A set of semi-active actuators is arranged in an elevator system to compensate a vibration of an elevator car. The actuators are controlled in accordance with the control policy based on a measured signal including values of the parameter measured during the operation of the elevator system. The control policy is determined, based on a model of the elevator system, wherein the control policy includes a state function representing an operation of the elevator system and a function of displacement representing an operation of the set of semi-active actuators. The state function is approximated, using the model of the elevator system, as a first function of a parameter representing the vibration. The function of displacement is approximated, using the model of the elevator system, as a second function of the parameter.

13 Claims, 15 Drawing Sheets

(56) References Cited

U.S. PATENT DOCUMENTS

| | | | |
|---|---|---|---|
| 7,401,683 B2* | 7/2008 | Husmann et al. | 187/292 |
| 7,909,141 B2* | 3/2011 | Utsunomiya | 187/292 |
| 2004/0020725 A1* | 2/2004 | Utsunomiya et al. | 187/292 |
| 2005/0145440 A1* | 7/2005 | Husmann et al. | 187/292 |
| 2005/0167204 A1* | 8/2005 | Husmann et al. | 187/292 |
| 2007/0000732 A1 | 1/2007 | Kulak | |
| 2007/0100522 A1* | 5/2007 | Kim et al. | 701/37 |
| 2009/0266650 A1* | 10/2009 | Utsunomiya | 187/391 |
| 2009/0292419 A1* | 11/2009 | Itagaki et al. | 701/40 |
| 2009/0294222 A1 | 12/2009 | Piech | |
| 2009/0308696 A1* | 12/2009 | Utsunomiya | 187/401 |
| 2012/0004777 A1* | 1/2012 | Wang | 700/280 |
| 2012/0271464 A1* | 10/2012 | Benosman et al. | 700/280 |

OTHER PUBLICATIONS

Choi et al., Semi-Active vibration isolation using magneto-rheological isolators, 2002.*

Canale, Semi-Active Suspension Control Using "Fast" Model-Predictive Technqiues, 2006.*

Shih et al., Semi-Active and Active Control of an ERF Embedded Pneumatic Vibration Isolator, 2005.*

Shen et al., Semi-Active Vibration Control schemes for Suspension Systems using Magneto-rheological Dampers, 2006.*

Lopez et al., Adaptive Control for an Active Suspension of an Elevator, 2010.*

Kang, Vertical-Vibration Control of Elevator Using Estimated Car Acceleration Feedback Compensation, 2000.*

Wang et al., Nonlinear Control Design for a Semi-Active Vibration Reduction System, Jul. 2011.*

T.J. Gordon, "Non-Linear Optimal Conrtol of a Semi-Active Vehicle Suspension System;" Aeronautical and Automotive Engineering and Transport Studies, Loughborough University of Technology Loughborough LE11 2TU, UK; Pergamon; Chaos, Solitions & Fractals; vol. 5, No. 9, pp. 1603-1617, 1995 Copyright 1995 Elsevier Science Ltd; Printed om Great Britain.

Sergio M. Savaresi et al., "Acceleration-Driven-Damper (ADD): An Optimal Algorithm for Comfort-Oriented Semiactive Suspensions;" Dipartimento di Elettronica e Informazione, Politecnico di Milano, Piazza L. da Vinci, 32, 20133 Milano, Italy; Transactions of the ASMA pp. 218-229 vol. 127, Jun. 2005.

* cited by examiner

300

700

SYSTEM AND METHOD FOR CONTROLLING SEMI-ACTIVE ACTUATORS

FIELD OF INVENTION

This invention relates generally to controlling a set of semi-active actuators, and more particularly to controlling the set of semi-active actuators to reduce a vibration in a system subject to disturbances.

BACKGROUND OF INVENTION

Vibration reduction in mechanical systems is important for a number of reasons including safety and energy efficiency of the systems. Particularly, vibration in various transportation systems is directly related to ride quality and safety of passengers, and, thus, should be reduced. For example, vertical vibration in vehicles can be controlled by active or passive vibration reduction systems, which are generally referred as suspension systems. Similarly, the vibration induced during an operation of an elevator system can be reduced.

The elevator system typically includes a car, a frame, a roller guide assembly, and guide rails. The roller guides act as a suspension system to reduce the vibration of the elevator car. The car and roller guides are mounted on the frame. The car and frame move along the guide rail as constrained by the guide rollers. When the elevator moves sufficiently fast, level variation or winding of the guide rails can induce significant lateral vibration in the frame and the car.

The vibration induced by, e.g., deformation of the guide rail, can be reduced by various types of the suspension system. Generally, there are passive, semi-active, and active types of the suspension systems. The passive suspension system has undesirable ride quality. The active suspension systems use separate actuators that can exert an independent force on the suspension to improve the riding and can provide desirable performance for reducing the vibration. The drawbacks of the active suspension system are high cost, added complication and mass, and the need for maintenance.

The semi-active suspension systems provide a better trade-off between the cost of the system and its performance. A semi-active actuator allows for the adjustment of parameters, such as viscous damping coefficient or stiffness, and can be used to reduce the vibration, and is reliable because such actuator only dissipates energy.

For example, one system, described in U.S. Pat. No. 5,289,902, reduces the lateral vibration of elevators using semi-active actuators, such as a hydraulic actuator. That system adjusts the damping coefficient of the actuator by controlling a movable orifice lever in a solenoid. However, because of the absence of control mechanism, the achievable performance might be limited, see also U.S. patent publication 2009/0294222. In another example, a vibration damper is used to reduce the axial and rotational vibrations of an automotive steering system, see U.S. Pat. No. 6,752,425. The vibration damper may be activated or deactivated by a controller by comparing a signal value from a steering wheel vibration sensor to a predetermined threshold value. Using semi-active actuators with variable stiffness is also described in U.S. patent publications Ser. No. 10/574,653, and in U.S. Pat. No. 7,543,686.

U.S. Pat. No. 5,712,783 discloses a vibration reduction method according to the skyhook damping to control an automotive load-leveling suspension, i.e. switching ON and OFF of the semi-active. This method uses relative position sensors to obtain the relative velocity, which is difficult and leads to unnecessary system cost.

Conventional semi-active vibration reduction requires the measurement of the relative velocities between the ends of semi-active actuators. The relative velocity is critical to determine the time to switch the semi-active actuators ON and OFF, which is directly associated with the vibration reduction performance.

Unfortunately, the measurement of the relative velocity adds to the cost, and reduces the reliability of the systems. Also, the measurement of the relative velocity is difficult, and sometimes impossible.

SUMMARY OF INVENTION

It is an objective of some embodiments of an invention to provide a system and a method for controlling a set of semi-active actuators arranged in a system to compensate a set of disturbances. Such system and the method should be suitable for a wide range of semi-active suspension systems subject to at least one external disturbance that can be applied to various structures and industries, such as an automotive industry, or an elevator industry.

It is a further objective of some embodiments, to provide such system and method that optimizes the control of the semi-active actuators while minimizing a number of sensors for measuring parameters of operation of the system. Various embodiments of the invention determine a control policy of the semi-active actuators. In some embodiments, a semi-active suspension system is represented as a mass-spring-damping model. To minimize the number of measured parameters, some embodiments approximate the optimal control, e.g., estimate some parameters based on a parameter representing the vibration of the system. An example of the parameter is a mass acceleration, such as an acceleration of an elevator frame or an elevator car in the elevator system.

Various embodiments determine the control policy based on a model of the system. For example, the control policy can include a state function representing an operation of the system and a function of displacement representing an operation of the set of semi-active actuators. Examples of the state function include accelerations, velocity, and position on various masses of the system. Examples of the function of displacement include relative position or velocity between ends of the actuators.

Various embodiments of the invention are based on a realization that the control policy for controlling the set of semi-active actuators can be approximated based on a model of the system. For example, in one embodiment for an elevator system, functions of the control policy are approximated based on the model of the elevator system as function of a parameter representing the vibration of the elevator system. In this embodiment, the vibration can be controlled in accordance with the control policy based on a measured signal including values of the parameter measured during the operation of the elevator system.

Also, some embodiments take advantage of another realization that a set of semi-active actuators can be controlled uniformly and thus a model of the system can be simplified based on that uniformity. Accordingly, some embodiments represent the system as a model of a virtual system having a single virtual semi-active actuator arranged to compensate a virtual disturbance. The virtual semi-active actuator represents the set of semi-active actuators.

For example, a compensative force of the virtual semi-active actuator represents compensative forces of the set of semi-active actuators. Similarly, the virtual disturbance represents a combination of the set of disturbances. Such realization allows defining the control policy for the virtual semiactive actuator, and controlling uniformly each actuator of the set of semi-active actuators according to the control policy of the virtual semi-active actuator.

In some embodiments, the control policy that optimizes a cost function, characterized by a parameter of operation of the virtual system, such as the mass acceleration, is approximated based on the virtual system model. According to the optimal control policy, the virtual semi-active actuator is switched ON and OFF, and the semi-active actuators are switched ON and OFF accordingly, i.e., dependently.

However, even for the virtual semi-active actuator, the optimal control policy can be difficult to implement because an analytical representation of optimal control policy can be difficult to obtain. Accordingly, some embodiments further approximate the control policy while preserving its structure, which ensures high performance of the resultant control system.

Accordingly, one embodiment discloses a method for controlling a set of semi-active actuators arranged in an elevator system to compensate a vibration of an elevator car caused by a set of disturbances during an operation of the elevator system. The method includes determining, based on a model of the elevator system, a control policy for controlling the set of semi-active actuators, wherein the control policy includes a state function representing an operation of the elevator system and a function of displacement representing an operation of the set of semi-active actuators; approximating, using the model of the elevator system, the state function as a first function of a parameter representing the vibration; approximating, using the model of the elevator system, the function of displacement as a second function of the parameter; and controlling the set of semi-active actuators in accordance with the control policy based on a measured signal of the parameter. The steps of the method are performed by a processor.

Another embodiment discloses an elevator system including an elevator car arranged in the elevator system for moving along an elevator shaft during an operation of the elevator system; a sensor for measuring a parameter representing a vibration of the elevator car during the operation, the sensor produces a measured signal; a set of actuators for compensating the vibration of the elevator car; and a controller for controlling uniformly the set of semi-active actuators according a control signal determined based on the measured signal and a control policy of a virtual semi-active actuator, wherein a compensative force of the virtual semi-active actuator represents compensative forces of the set of semi-active actuators.

Yet another embodiment discloses a method for controlling a set of semi-active actuators arranged in a system to compensate a set of disturbances along a direction of disturbance, which includes representing the system as a model of a virtual system having a single virtual semi-active actuator arranged to compensate a virtual disturbance along the direction of disturbance, wherein a compensative force of the virtual semi-active actuator represents compensative forces of the set of semi-active actuators, and wherein the virtual disturbance represents a combination of the set of disturbances; and controlling each actuator of the set of semi-active actuators according to a control policy of the virtual semi-active actuator.

For example, some variations of the embodiments control a set of semi-active actuators to compensate for a set of disturbances based only on measurements of a parameter representing acceleration of a frame or a car of an elevator system. Some embodiments provide approximation by treating the function of displacement as an independent variable, allowing deriving the model of the independent variable in the form of a state equation whose right hand side is a function of itself and unknown variables. The dependence of the model the independent variable on unknown variables can be removed by a number of methods, for instance, imposing symmetry assumption on the transportation system, or model simplification techniques, which leads to a deterministic model of the independent variable. In one of embodiment, when the semi-active actuator is a damper, the function of displacement is a relative velocity of the semi-active actuator.

Some embodiments provide a control method for reducing lateral vibration in an elevator system subject to disturbances using a number of semi-active actuators with adjustable damping coefficients. Various embodiments of the control method only require the measurements of frame accelerations. Particularly, one embodiment requires the measurements of translational and angular accelerations along the frame in six directions.

Another embodiment only requires the measurements of two translational accelerations in back-and-forth and right-and-left directions. The embodiment results in a semi-active elevator suspension, which can reduce a peak resonance in a low frequency without compromising the vibration reduction performance over a mid-range frequency. Thus, the fundamental limitation imposed by the conventional passive architecture is overcome, and a quality of the ride improves.

DETAILED DESCRIPTION OF EMBODIMENTS OF INVENTION

Figure 1A:
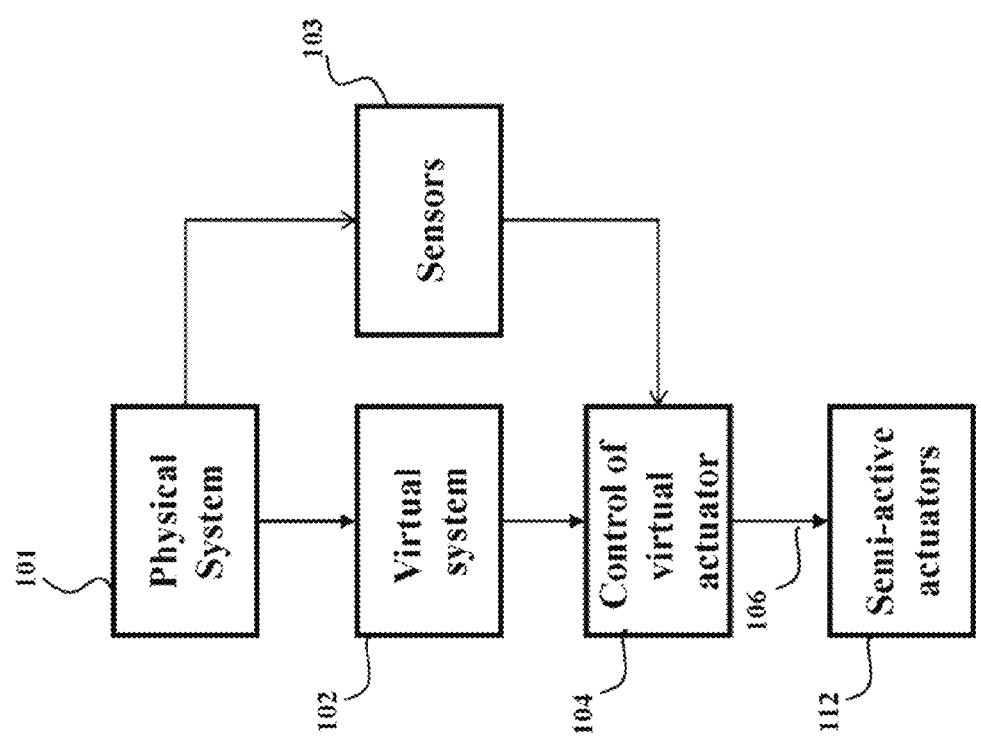
FIGS. 1A-C are block diagrams of a control method according to some embodiments of an invention.

Various embodiments of an invention disclose a system and a method suitable to control a system having semi-active actuators. Some embodiments are directed to a suspension system subject to at least one external disturbance in a direction of a disturbance, and at least one semi-active actuator is controlled to reduce the vibration of one of masses induced by the corresponding disturbances.

For clarity purposes, this disclosure focuses on the control method of a system using semi-active actuators to reduce vibration induced by disturbances in one direction of, and the system is subject to external disturbances in that direction. A control method to reduce vibration in multiple directions can be derived by readily generalizing the disclosed control method.

Given a set of disturbances and a set of semi-active actuators, some embodiments of the invention represent the system as a model of a virtual system having a single virtual semi-active actuator arranged to compensate a virtual disturbance. For example, a compensative force of the virtual semi-active actuator represents compensative forces of the set of semi-active actuators, and the virtual disturbance represents a combination of the set of disturbances. In various embodiments, such representation is based on assumption of uniformity of the semi-active actuators, i.e., all semi-active actuators perform and are controlled in a similar way.

In various embodiments of the invention, control of semi-active actuators is derived according to an optimal control theory and is based on the model of the system. In some embodiments, the model of the system is represented by a model of a virtual system. For example, one embodiment controls uniformly each actuator of the set of semi-active actuators according to an optimal control policy of the virtual semi-active actuator. Specifically, some embodiments are based on a realization that it is advantageous to control the set of actuators according to the optimal control policy that optimizes parameter of operation of the system.

However, determining such control policy based on a model of the system can be difficult, and some embodiments use the model of a virtual system and approximately minimize a cost function representing an operation of the system while preserving a structure of the control policy. The structure of the control policy can be in the form of switching ON and OFF according to a control signal, and ensures high performance of the resultant semi-active vibration reduction control system. The approximation of the control policy reduces the cost of measuring parameters of the operation and difficulties in obtaining analytical expression of the optimal control policy.

In some embodiments, the control of the system is based on the feedback mechanism. Specifically, in one embodiment, the control optimizes a parameter of an operation of the virtual system, such that during the operation of the system, the set of semi-active actuators is controlled based on the control policy and a measured signal including values of the parameter measured during the operation of the system.

Specifically, a control signal of the semi-active actuator can be determined on the basis of the detected vibration of a mass. For example, the function of the parameter represents vibration signals, such as accelerations of the mass in the system for which the vibration has to be reduced, and the controlling is based on the measurement of accelerations of the masses.

For example, there is a need to reduce vibration of vehicles. Similarly, there is a need to reduce vibration of elevator cars. The vibration of the mass, representing the car body in automotive or the elevator car in elevators, can be characterized by a number of metrics, for instance, a root mean square of the mass acceleration, a two norm (square root of squares) of the mass acceleration, an infinity norm of the mass acceleration, a peak-to-peak value of the mass acceleration, etc. Without of loss of generality, some embodiments use the two norm of the mass acceleration metric.

Figure 1B:
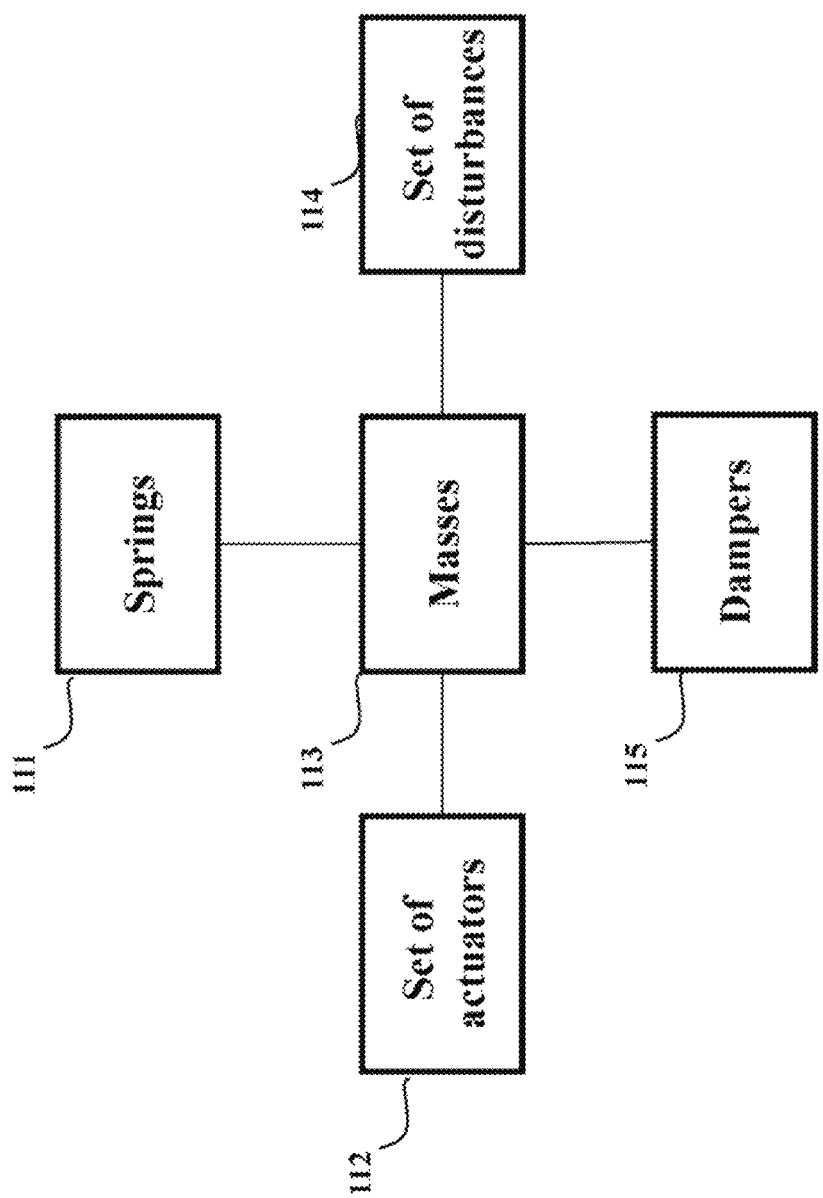
Figure 1C:
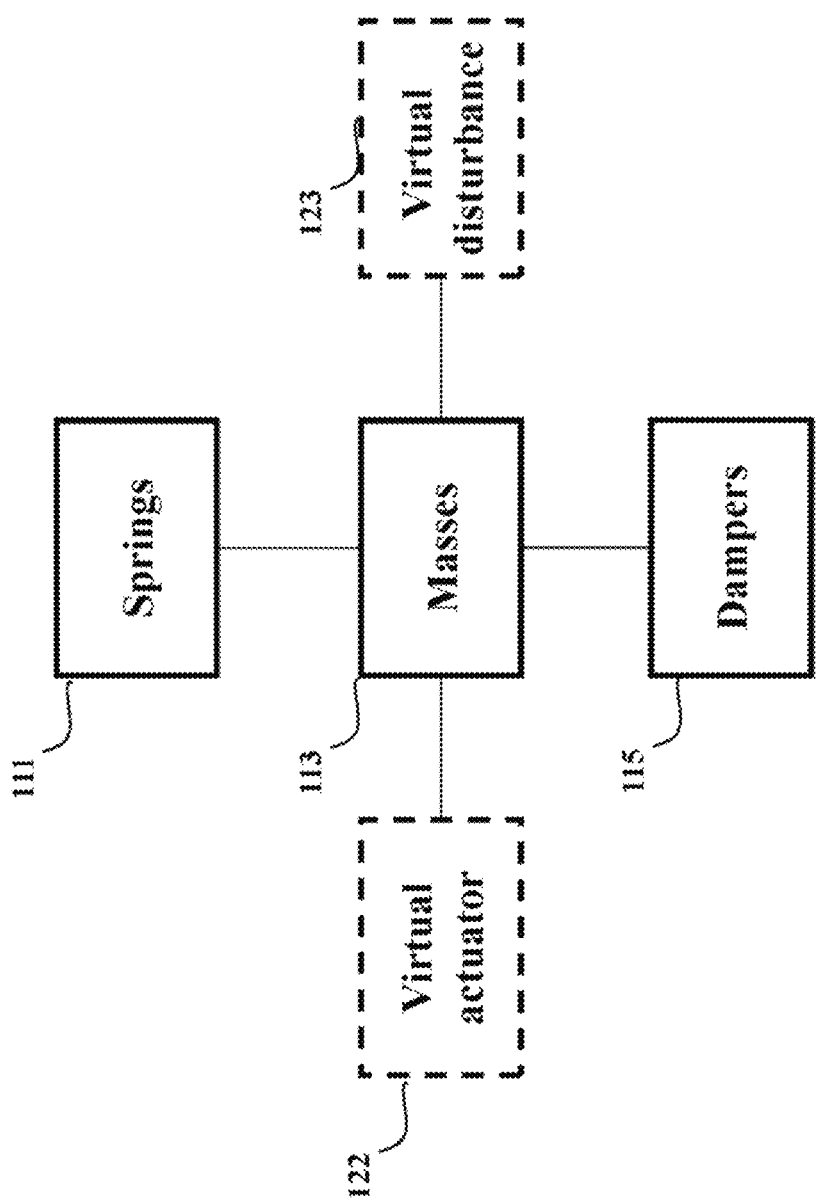

FIG. 1A shows a schematic of a system and method for controlling a set of semi-active actuators. The control method starts with a representation of a model of a physical system 101. FIG. 1B shows an example of the model, including one or a combination of masses 113, springs 111, dampers 115, and a set of semi-active actuators 112. The system is subject to a set of disturbances 114. In one embodiment, the system 101 is represented as a model of a virtual system 102 based on the assumption that all relevant semi-active actuators perform uniformly. As shown in FIG. 1C, the virtual system includes one or combination of the masses 113, the springs 111, and the dampers 115. The virtual system also includes a virtual semi-active actuator 122, and is subject to a virtual disturbance 123.

The disturbances affect the movement of masses in one direction. One virtual disturbance in a specific direction represents the combined effect of all relevant disturbances on the movement of the masses in that direction. Similarly, a virtual actuator corresponding to a virtual disturbance in a specific direction accounts for the effect of all relevant semi-active actuators on the masses in that specific direction.

Sensors 103 measure a signal indicating an operational status of the system 101. Given the model of the virtual system, and the measured signal, a control signal 106 is determined 104 according to an optimal control policy of the virtual semi-active actuator. The control signal 106 can vary either the voltage or current. The signal can be directly output to the semi-active actuators 112, or indirectly via amplifiers.

As shown in FIGS. 1B-1C, the difference between the physical system and the virtual system is the presence of the virtual actuator and virtual disturbance in the virtual system. One embodiment, in order to determine the virtual system, determines the virtual disturbances and the virtual semi-active actuator. Under the assumption that all semi-active actuators corresponding to the movement of one mass in a specific direction perform uniformly, all disturbances affecting the movement of the mass in the specific direction can be combined as a virtual disturbance, and the effect of all corresponding semi-active actuators on the mass in the specific direction can be characterized by a virtual semi-active actuator which is mounted between the mass and the source of the virtual disturbance.

Figure 2:
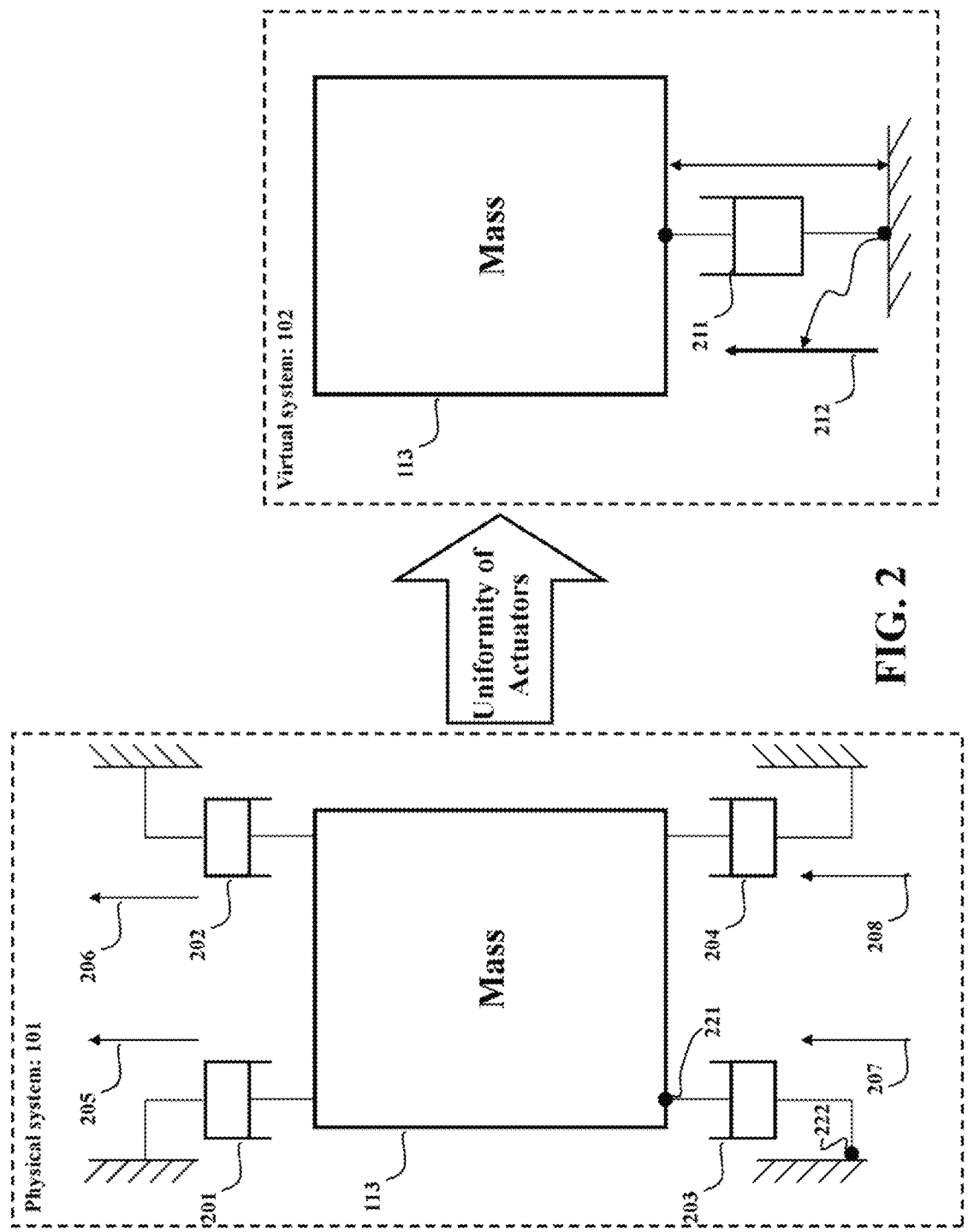
FIG. 2 is a schematic of determining a model of a virtual system including a virtual actuator according to some embodiments of the invention.

FIG. 2 shows an example of the physical system disturbed by four external disturbances $w_1$, $w_2$, $w_3$, $w_4$ in the vertical direction, denoted by 205, 206, 207, 208 respectively. The set of semi-active actuators 201, 202, 203, 204 are mounted on the same mass 113 to compensate for the set of disturbances. Particularly, the first ends of four semi-active actuators, e.g., a first end 221, are mounted on the mass 113, and the second ends of four semi-active actuators, e.g., a second end 222, are mounted on corresponding source of the disturbances $w_1$, $w_2$, $w_3$, $w_4$, respectively.

For example, in some embodiment each semi-active actuator is a semi-active damper having a controlled damping coefficient $u_i$, $1 \le i \le 4$. Assuming that all semi-active actuators are controlled uniformly, i.e., switched ON or OFF at the same time, the physical system is reduced to a virtual system with a virtual disturbance 212 and the virtual semi-active actuator 211. Particularly, the virtual disturbance is a sum of four disturbances, and denoted as $$\bar{w} = \frac{1}{\sum_{i=1}^{4} u_i} \sum_{i=1}^{4} u_i w_i.$$

The virtual semi-active actuator has a controlled damping coefficient of $$\bar{u} = \sum_{i=1}^{4} u_i.$$

For the embodiment with all the semi-active actuators having the same controlled damping coefficients, the virtual semi-active actuator has a controlled damping $\bar{u}=4u_i$, and the virtual disturbance is $$\bar{w} = \frac{1}{4} \sum_{i=1}^{4} w_i.$$

Without loss of generality, all k semi-active actuators, a type of damping device, are applied on the same mass m with a displacement x. Hence, the ith semi-active actuator generates a compensating force of $f_i = u_i(\dot{x} - \dot{w}_i)$ where $u_i$ is the controlled damping coefficient of the ith semi-active actuator. The compensating forces of the set of semi-active actuators are $$f = \sum_{i=1}^{k} u_i(\dot{x} - \dot{w}_i),$$

where the dots above the variables indicate derivatives.

In one embodiment, the semi-active actuators perform uniformly, and the semi-active actuators have the same controlled damping coefficients, the compensating forces of all semi-active actuators is $$f = u \sum_{i=1}^{k} (\dot{x} - \dot{w}_i) = ku\left(\dot{x} - \frac{1}{k}\dot{w}_i\right),$$

based on which a virtual semi-active actuator generates the same compensating force as all k semi-active actuators can be determined. For example, the controlled damping coefficient of the virtual semi-active actuator is ku, the virtual relative velocity of the virtual semi-active actuator is $$\dot{x} - \frac{1}{k}\sum_{i=1}^{k} \dot{w}_i,$$

and the virtual disturbance is $$\frac{1}{k}\sum_{i=1}^{k} \dot{w}_i.$$

Another embodiment determines a virtual semi-active actuator based on the transformation of the model representing the physical system. Combining with the model of the physical system and the assumption that all relevant semi-active actuators perform uniformly, the model of the virtual system can be derived, thus a set of virtual semi-active actuators, and a set of virtual disturbances are determined. The details are described below.

Figure 3A:
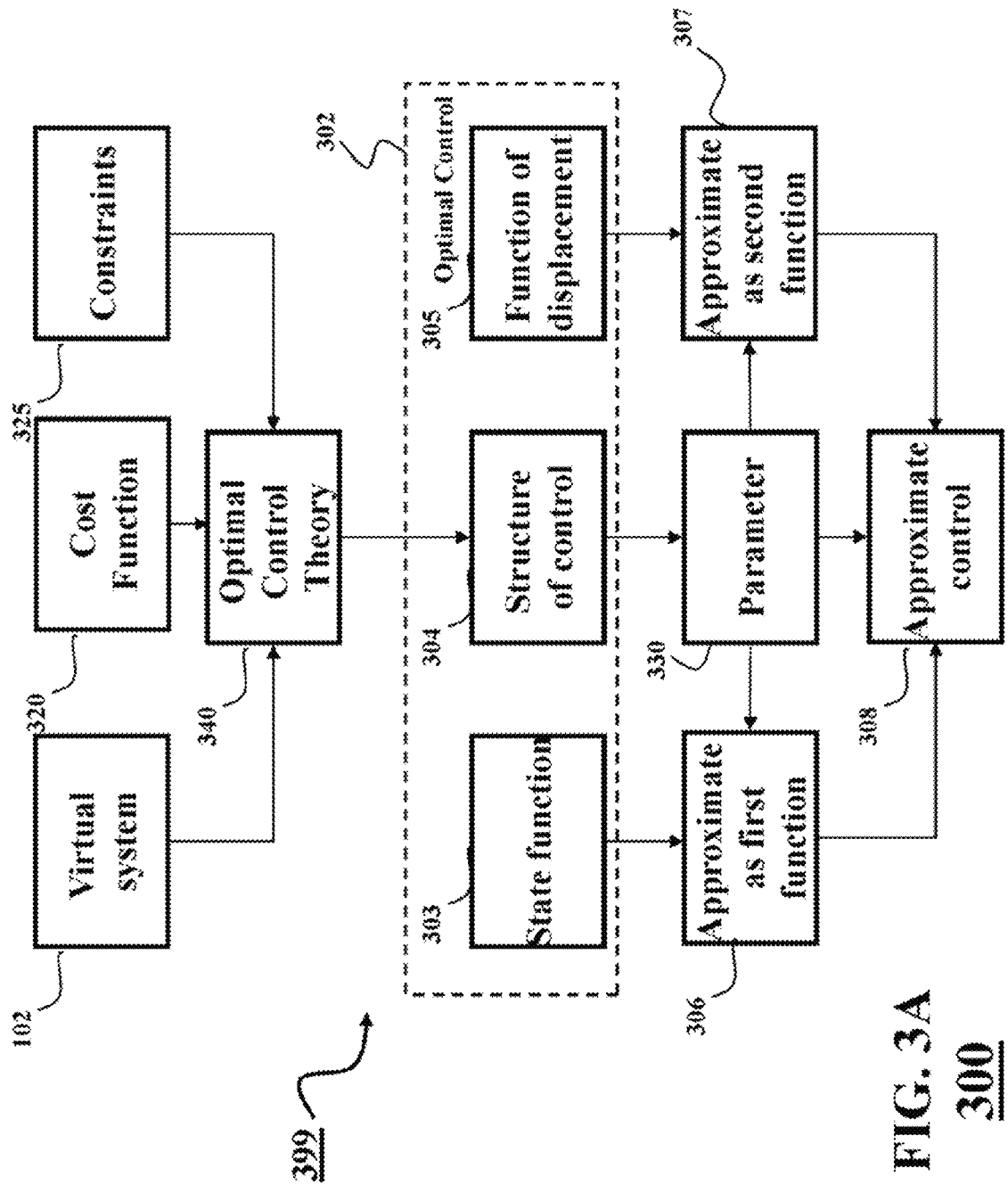
FIGS. 3A-B are block diagrams of a method for determining an approximate control of a virtual actuator according to some embodiments of the invention.

FIG. 3A shows a block diagram of a method 300 for controlling a set of semi-active actuators according to one embodiment of the invention. The method can be implemented using a processor 399 connected, e.g., to memory and/or input/output interfaces. Based on the model of the virtual system 102, a control policy of the virtual semi-active actuator is defined 302 based on principles of the optimal control theory 340. For example, the control policy 302 optimizes a cost function 320 representing an operation of the virtual system, such that a function of a parameter of operation 330, e.g., a two norm of the mass acceleration, is optimized, e.g., minimized. The cost function is subject to various constraints 325, such as constraints on the semi-active actuators, for instance maximal and minimal damping coefficients.

The structure 304 of the control policy 302 of the virtual semi-active actuator in the virtual system can be determined, e.g., by applying the minimum principle of the optimal control theory. For example, when the virtual semi-active actuator is a damper with an adjustable viscous damping coefficient, the optimal control policy for determining a control signal $\bar{u}$ for controlling the actuators has the following structure $$\bar{u} = \begin{cases} b_{max}, & \varphi(x, y, t)\upsilon > 0, \\ b_{min}, & \text{otherwise,} \end{cases}$$

where $\varphi(x,y,t)$ is a state function 303, $\xi$ is the virtual relative velocity of the virtual semi-active actuator or the function of displacement 305, $b_{max}$ is the maximal damping coefficient of the virtual semi-active actuator, and $b_{min}$ is the minimal damping coefficient of the virtual semi-active actuator.

In another embodiment, wherein the semi-active actuators are dampers which generate damping forces directly, the optimal control policy has the following structure $$\bar{u} = \begin{cases} f_{max}, & \varphi(x, y, t)\upsilon > 0, \\ f_{min}, & \text{otherwise,} \end{cases}$$

wherein $f_{max}$ is the maximal damping force of the virtual semi-active actuator, and $f_{min}$ is the minimal damping force of the virtual semi-active actuator.

In another embodiment, wherein the virtual semi-active actuator is a spring, the optimal control policy has the following structure $$\bar{u} = \begin{cases} K_{max}, & \varphi(x, y, t)\chi > 0, \\ K_{min}, & \text{otherwise,} \end{cases}$$

where $\chi$ is the virtual relative position of the virtual semi-active spring, $K_{max}$ is the maximal stiffness of the virtual semi-active spring, and $K_{min}$ is the minimal stiffness of the virtual semi-active spring.

As can be seen from the above examples, the structure 304 of the optimal control policy 302 that minimizes the cost function by switching ON or OFF the semi-active actuators is based on a sign of the product of a state function 303 of the system and a function of displacement 305 of the actuators. In some embodiments, the state function represents an operation of the system and the function of displacement represents an operation of the set of semi-active actuators.

For example, in one embodiment, the state function is a function of a state, a costate and the virtual disturbance of the system. The expression of the state function in the optimal control policy is difficult to obtain, and therefore, some embodiments approximate 306 the state function. In one embodiment, a first function, an approximation of the state function, is a linear combination of measured signals, and estimated signals obtained by filtering the measured signals.

Similarly, the function of displacement can include a displacement between the first and the second ends of the virtual semi-active actuator caused by the virtual disturbance. Alternatively, the function of displacement can include a virtual relative velocity between the first and the second ends of the virtual semi-active actuator. The function of displacement 305 is also difficult or expensive to measure, and some embodiments approximate the function of displacement the second function 307. In one embodiment, the second function is approximated as a linear combination of measured parameters, and estimated parameters obtained by filtering the measured signals. Thus, in various embodiments, the optimal control 302 is approximated 308 by combining the structure of the optimal control policy 304, the first function 306, and the second function 307.

This embodiment is based on a realization that the control of the semi-active actuator based on the optimal control theory according to the state of the system is advantageous. For some embodiments, the control relies on the displacement between the ends of the virtual semi-active actuator, and the knowledge of the value of the function of displacement implies the direction of forces generated by the semi-active actuators and thus is required to optimally control the semi-active actuators. For example, a result of the function of the displacement can include a virtual relative velocity between the first and the second ends of the virtual semi-active actuator.

Furthermore, some embodiments are based on a realization that model of the system or model of the virtual system can be used to approximate the state function and the function of displacement with respect to a single parameter representing the vibration of the system, such as acceleration. Hence, number of sensors for measuring the various parameters of the system during the operation can be reduced to, e.g., one sensor, such as accelerometer.

Figure 3B:
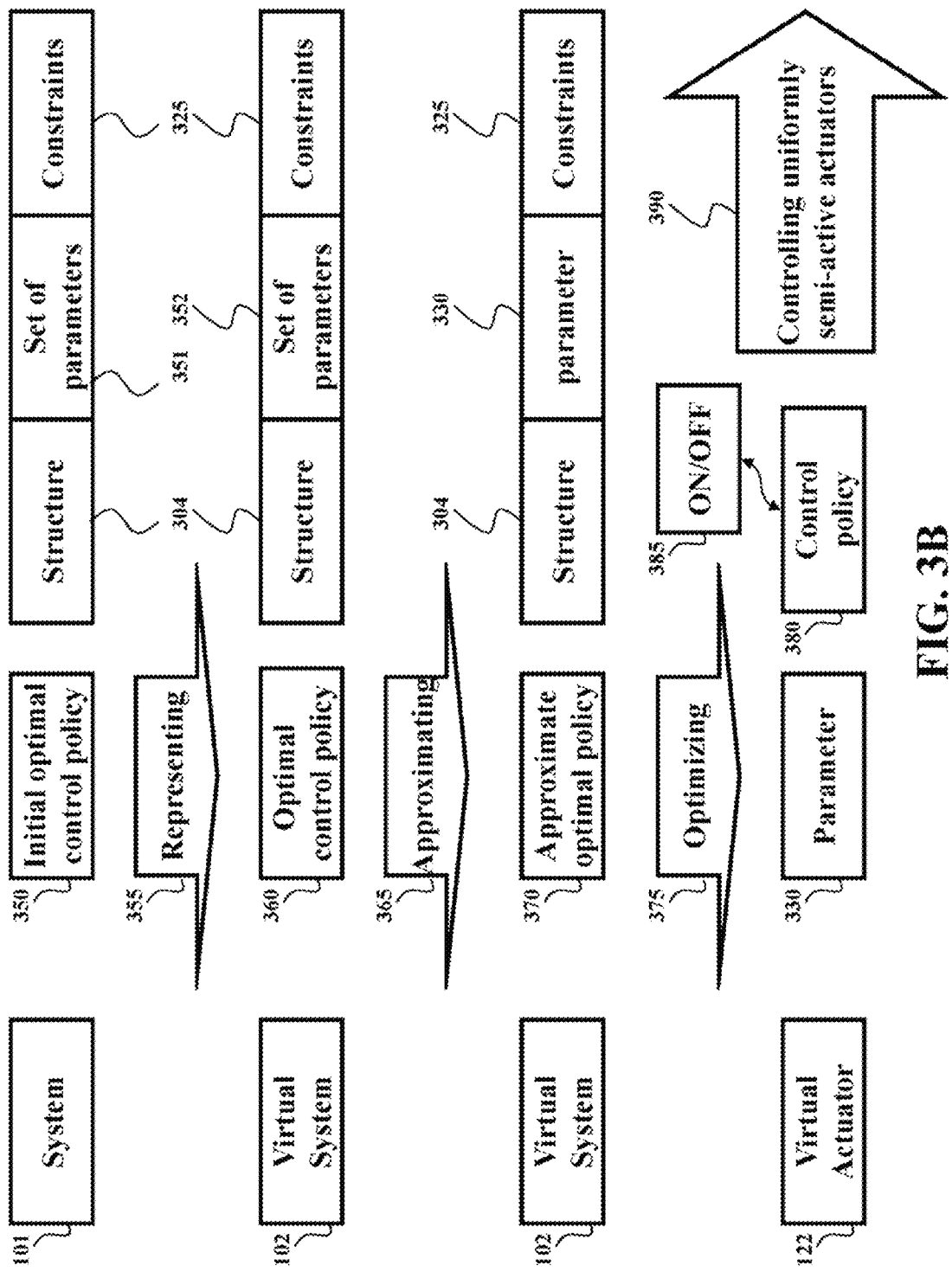

FIG. 3B shows schematically some realizations employed by the method 300. An operation of the system 101 can be represented by an initial optimal control policy 350. The structure 304 of the initial optimal control policy 350 can be determined based on the optimal control theory. The initial optimal control policy 350 includes functions of the set of parameters 351 of operation of the system, such as acceleration and velocity of the masses of the system, relative velocity between the ends of the actuators, a state, a costate of the system and the disturbance of the system. If such a cost function 320 is optimized subject to constraints 325, the initial optimal control policy of the set of semi-active actuators can be determined. However, solving the analytical expression of the initial optimal control policy, which optimizes such cost function, is difficult, and the implementation of the analytical solution requires multiple measurements, which increases the cost of the control system.

Accordingly, some embodiments determine, based on a model of a virtual system 102, an optimal control policy 360 representing 355 an optimal operation of the virtual system 102. The optimal control policy 360 has the same structure 304 as the initial optimal control policy and includes functions of a set of parameters of operation of the virtual system. The introduction of the virtual system simplifies the derivation and expression of the optimal control policy 360, while preserving the performance due to the preservation of the structure of the initial optimal control policy. However, even after simplification based on the virtual system, it is difficult to explicitly derive the optimal control policy 360 that optimizes the cost function, due to difficulties in measuring disturbances and the set of parameters 352 of the virtual system, such as a displacement between ends of the virtual semi-active actuator caused by the virtual disturbance, a relative velocity and acceleration between the ends of the virtual semi-active actuator, a state, a costate of the virtual system and the virtual disturbance.

Some embodiments approximate 365 the optimal control policy 360 to produce an approximate optimal (control) policy 370 that has the same structure 304, but includes functions of a parameter 330 of the operation of the system. Typically, the parameter 330 can be measured during the operation of the system, e.g., an acceleration of an elevator car, or an automobile. The approximation 365 is usually based on the model of the virtual system, and the expression of the cost function to be optimized, and varies in dependence of a type of the system. Examples of the approximation are provided in this disclosure.

Next, in response to measuring the parameter during the operation of the system, the cost function is optimized 375 subject to constraints by implementing a control policy 380 of the virtual semi-active actuator. For example, the control policy provides switching time 385 for the virtual semi-active actuator. The set of semi-active actuators of the system is controlled uniformly 390 based on the control policy of the virtual semi-active actuator.

It is not always reasonable or possible to directly measure the results of the function of displacement, or the state function. In some embodiments, the function of displacement and the state function are approximated as a combination of the measured and estimated signals obtained using a set of filters.

Figure 4:
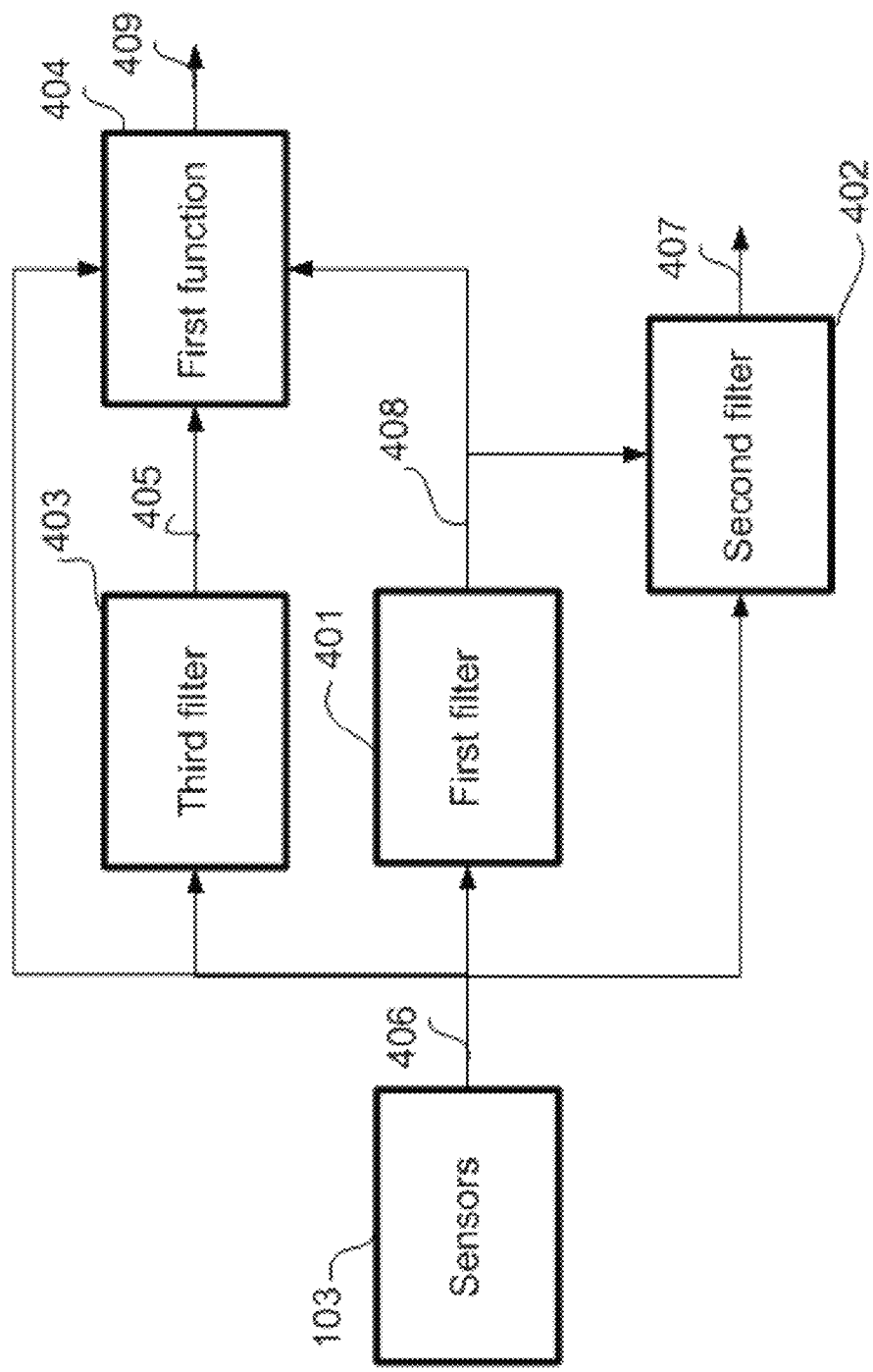
FIG. 4 is a block diagram of a system of filters for approximation of control policy according to some embodiments of the invention.

FIG. 4 shows a schematic of a system and a method for approximating the state function and the function of displacement using a first filter 401, a second filter 402, and a third filter 403. For example, the sensors 103 measure the parameter of the operation and output the measured signal 406 to the first, the second, and the third filters. Example of the measured signal can be an acceleration of an elevator car or an elevator frame.

For example, based on the measured acceleration of the elevator frame, the first filter generates an estimated signal 408 representing, e.g., accelerations of the elevator car, and the third filter generates an estimated signal 405 representing, e.g., velocities of the elevator frame. The second filter 402 generates a signal 407, which approximates the value of the function of displacement based on the measured signal 406 and the estimated signal 408. The first function 404 outputs the approximate values 409 of the state function based on the measured signal 406 and the estimated signals 405 and 408. The approximated control policy approximates the function of displacement including the virtual relative velocity as a function of estimated signals, and approximates the state function of the system state, costate, and disturbances as a function of the measured signal and the estimated signals.

In one embodiment, the first, the second, and the third filters are based on the model of the virtual system. For instance, if the sensor 103 outputs the acceleration signal of a mass, then the third filter estimates the velocity signal of the mass. The third filter acts as an integrator based on the relationship between the velocity and the acceleration. For example, the third filter can include a band-pass filter to avoid offset and noise of the measured acceleration signal.

Figure 5:
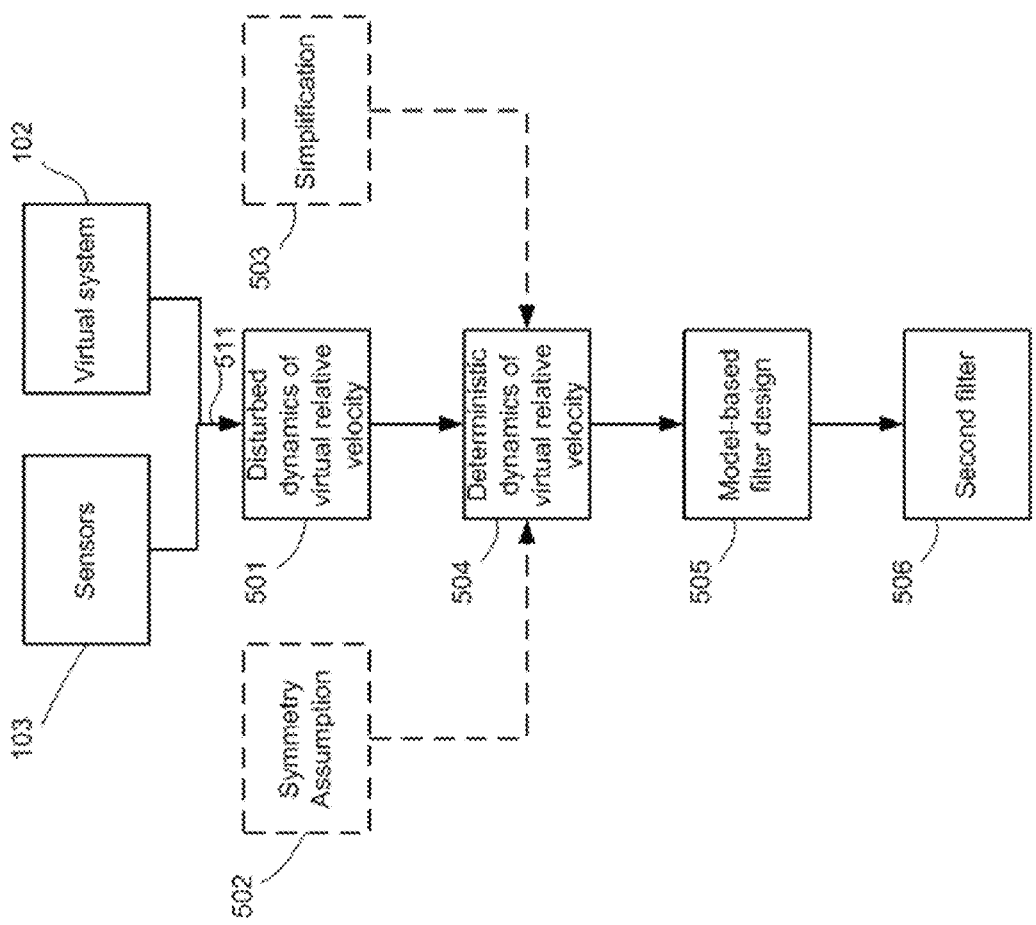
FIG. 5 is a block diagram of a filter according to some embodiments of the invention.

FIG. 5 is a block diagram of a method for designing the second filter according to embodiments of the invention, wherein the function of displacement is the virtual relative position or velocity of the virtual semi-active actuator. The block 501 takes the function of displacement, e.g., the virtual relative position or relative velocity, as an independent variable and the measured signal as an input. Using the model of the virtual system, and the measured signal 511 representing vibration of the system, the dynamics of the virtual relative position/velocity of the virtual actuator can be written in the form defined as disturbed dynamics of the relative displacement, such as virtual relative position or velocity. Thus, one embodiment represents the disturbed dynamics of the function of displacement based on the model of the virtual system, the disturbed dynamics includes known variables corresponding to the measured signal and unknown variables.

In one embodiment, the disturbed dynamics of the relative displacement is $$\dot{\chi}=F(\chi,y,\xi,u,\epsilon),$$

wherein $\chi$ represents a column vector whose component includes a function of displacement of the ends of the virtual semi-active actuator, such as one or combination of the virtual relative position, the virtual relative velocity, the virtual relative acceleration, and $\xi$ represents estimated signals 404 from the first filter, such as the accelerations of the elevator car, y is the measured signal, such as acceleration of the elevator frame, u is the control input for controlling the virtual semi-active actuator, and $\epsilon$ is unknown variables of the disturbed dynamics, such as elevator frame and car angular velocity and position, or angular acceleration of the rotation arm of a roller guide in the elevator system.

Some embodiments transforms, using the model of the virtual system, the disturbed dynamics into deterministic dynamics independent of the unknown variables. In some embodiments, the deterministic dynamics of the virtual relative velocity 504 is $$\dot{\chi}=F(\chi,y,\xi,u) \quad (1)$$

Given the dynamics (1), a model-based design can be performed in block 505 to design the second filter 506.

For example, one embodiment performs the transforming based on a symmetry assumption. The disturbed dynamics of the virtual relative position is not guaranteed to be in the form of Equation (1), thus the second filter may not yield a convergent approximation of the value of the function of displacement. To avoid this, the virtual or physical system can be required to satisfy a symmetry assumption 502. For a different system, the symmetry condition can take a different form, as described in the following exemplary embodiments.

Another embodiment performs the transforming based on a simplification of the disturbed dynamics according to relative dominants of components of the disturbed dynamics. For example, some embodiments use the symmetry assumption 502 of the system to transform the disturbed dynamics of the virtual relative velocity 501 into a deterministic dynamics of the virtual relative velocity (1). If the physical system does not satisfy the symmetry assumption, in one embodiment the disturbed dynamics of the virtual relative position/velocity is simplified 503 to ensure that the resultant dynamics of the virtual relative position/velocity are in the form of Equation (1). For example, one embodiment ignores unknown variables $\epsilon$ of the disturbed dynamics, e.g., the virtual relative position, having comparatively small values with respect to other terms.

The second filter 506 can be determined 505 based on the model of the system according to the deterministic dynamics 504. One embodiment of the second filter is $$\dot{\hat{\chi}}=F(\hat{\chi},y,\xi,u),\hat{\chi}(0)=0,$$

wherein $\hat{\chi}$ is the approximation of $\chi$. The virtual relative velocity or the value of the function of displacement can be approximated from the value of $\hat{\chi}$ and its dynamics.

Because the semi-active suspension system is essentially passive, the entire system is stationary as time goes to infinity and disturbances are zero. Thus, the stable dynamics of the virtual relative position means that the virtual relative position is zero as time goes to infinity, assuming y=$\xi$=0. This ensures that the output of the second filter $\hat{\chi}$ converges to the true value of $\chi$ as time goes to infinity.

Some embodiments are based on another realization that the ultimate purpose of the second filter is to provide accurate estimation of the sign of the function of displacement instead of the approximation accuracy of the value of the function of displacement. Hence, for a large class of system, even the second filter provides an inaccurate estimation of the value of the function of displacement, in the absence of the symmetry condition, the second filter still can provide a good estimation of the sign of the value of the function of displacement.

Some embodiments design the first filter by following the same principle described in conjunction with FIG. 5. For example, one embodiment defines the function to be estimated as an independent variable, and derives disturbed dynamics of that function based on the model of the system. Next, the embodiment derives the deterministic dynamics on the basis on, e.g., the symmetry assumption or simplification, and designs the filter based on the deterministic dynamics.

Figure 6:
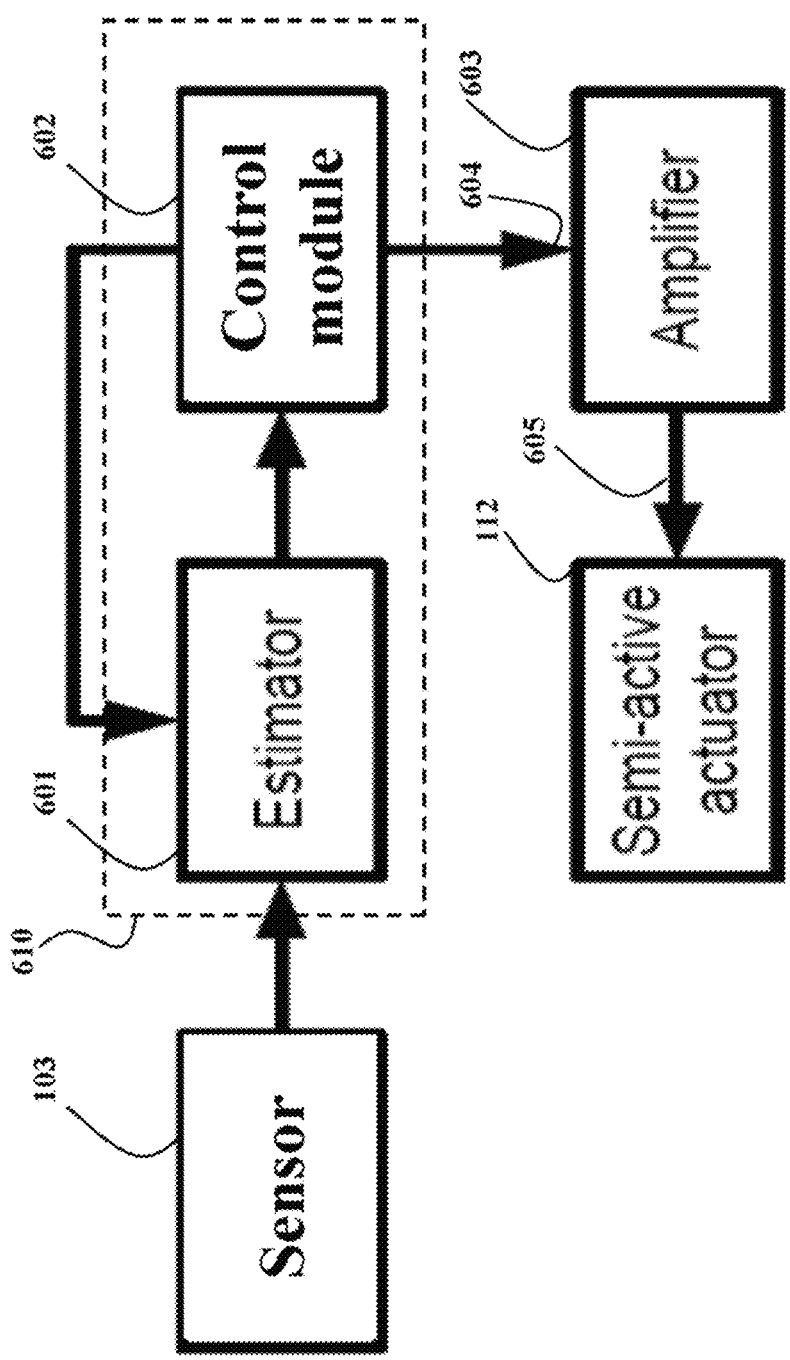
FIG. 6 is a block diagram of a control system of a semi-active vibration reduction system according to some embodiments of the invention.

FIG. 6 shows a block diagram of a control system for controlling an operation of a system having a set of semi-active actuators arranged to compensate for a set of disturbances according one embodiment. The control system includes a sensor 103 for measuring a parameter of operation of the system and producing the measure signal, and a controller 610 for controlling, e.g., uniformly, the set of semi-active actuators according a control signal 604 determined based on the measured signal and a control policy of a virtual semi-active actuator, wherein a compensative force of the virtual semi-active actuator represents compensative forces of the set of semi-active actuators.

In one embodiment, the controller includes an estimator 601, including the first, the second, and the third filters, to provide estimated signals to approximate the first and the second function of the optimal control policy. A control module 602 determines the ON/OFF control signal 604 from the outputs of the sensor 103 and the estimator 601. Amplifier 603 drives the semi-active actuators 112 uniformly by outputting either current or voltage signals 605 to all relevant semi-active actuators.

Exemplary Embodiment I

Figure 7:
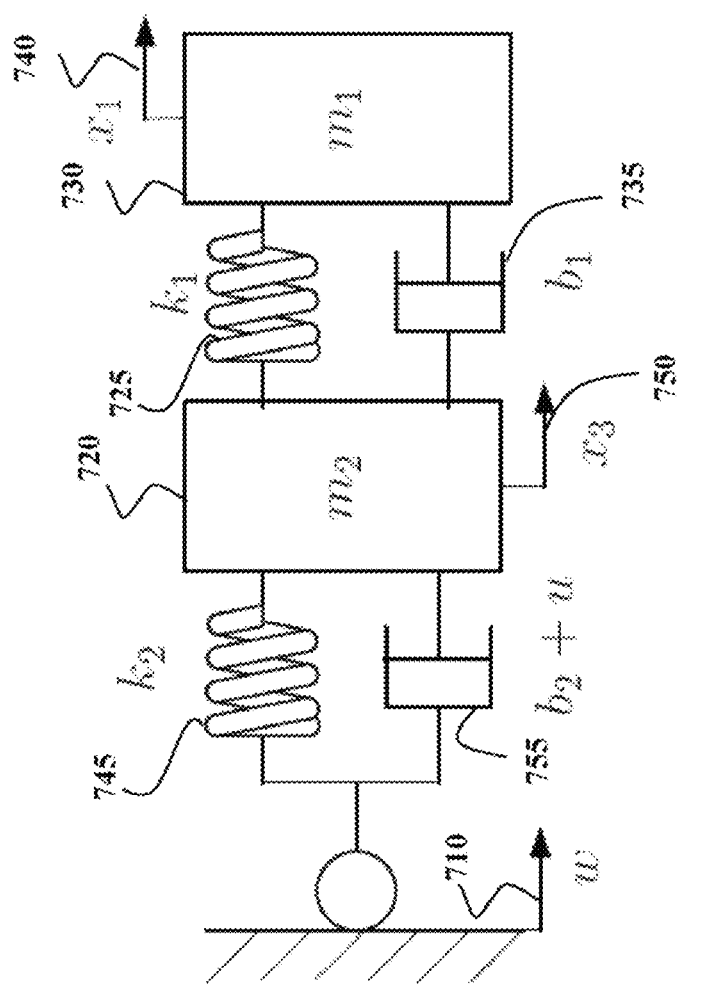
FIG. 7 is an exemplar model of a semi-active vibration reduction system subject to an external disturbance.

FIG. 7 shows a schematic of a system represented as a mass-spring-damping system 700 subject to a disturbance applied on the center of mass. Without loss of generality, the translational movements of the mass are horizontal. The disclosed methods are also applicable to vertical movements, for instance automotive suspensions.

In the system 700, w is a vibration source or the external disturbance 710, $m_1$ and $m_2$ represent masses of an elevator car 730 and an elevator frame 720, respectively, $k_1$ 725 and $b_1$ 735 are the lumped stiffness and damping of support rubbers between the car and the frame, $k_1$ 745 and $b_2$ 755 are the stiffness and damping of springs between the frame and the guide rail, $x_1$ and $x_3$ are the horizontal displacements 740 and 750 of the car and the frame respectively, and $x_2=\dot{x}_1$ and $x_4=\dot{x}_3$ are the horizontal velocities of the car and the frame respectively.

The model as expressed in Equation (1) of the disturbed mass-spring-damping system can be written as $$\begin{bmatrix} \dot{x}_1 \\ \dot{x}_2 \\ \dot{x}_3 \\ \dot{x}_4 \end{bmatrix} = \begin{bmatrix} 0 & 1 & 0 & 0 \\ -\frac{k_1}{m_1} & -\frac{b_1}{m_1} & \frac{k_1}{m_1} & \frac{b_1}{m_1} \\ 0 & 0 & 0 & 1 \\ \frac{k_1}{m_2} & \frac{b_1}{m_2} & -\frac{k_1+k_2}{m_2} & -\frac{b_1}{m_2} \end{bmatrix} \begin{bmatrix} x_1 \\ x_2 \\ x_3 \\ x_4 \end{bmatrix} + \begin{bmatrix} 0 \\ 0 \\ 0 \\ -\frac{x_4 - \dot{w}}{m_2} \end{bmatrix}(u + b_{2d}) + \begin{bmatrix} 0 \\ 0 \\ 0 \\ \frac{k_2}{m_2} \end{bmatrix}w,$$

$$y = \dot{x}_4,$$

where u is the controlled damping coefficient of the semi-active actuator, and y represents the measured parameter of operation, i.e., the acceleration of the frame. The control signal u is designed to reduce the car acceleration $\ddot{x}_1$. Because there is only one disturbance, the physical semi-active actuator is the virtual semi-active actuator, and the virtual disturbance is the physical disturbance. Thus the system model based on equation (1) also represents the virtual system model. For the automotive suspension case, the car suspension is modeled similarly but the movement of masses is in the vertical direction, and the guide rail is replaced with the road.

Given the virtual system model, the control constraints on the damping coefficients of the semi-active actuator, and applying the optimal control theory, e.g., the minimum principle, the optimal control policy minimizing the car acceleration has a structure $$u = \begin{cases} b_{max}, & \varphi(x, y, t)(x_4 - \dot{w}) > 0, \\ b_{min}, & \text{otherwise,} \end{cases}$$

where $x=(x_1, \ldots, x_4)^T$ is the state of the disturbed mass-spring-damping system, $b_{max}$ is the maximal damping coefficient of the semi-active actuator, $b_{min}$ is the minimal damping coefficient of the semi-active actuator, $\varphi$ is the function of the state, the co-state $\lambda$ the disturbance w, and T is a transpose operator. The function of displacement is defined by $\eta = x_4 - \dot{w}$. In this exemplary embodiment, the function of displacement is the virtual relative velocity of the virtual semi-active actuator. The optimal control policy switches ON or OFF the semi-active actuator at the optimal time to ensure the minimization of the car acceleration.

This embodiment uses the sensors 103 to measure only frame acceleration, i.e. the parameter of operation is the frame acceleration, i.e., $y=\dot{x}_4$, thus the true values of the state x and the relative velocity $\eta$ are not measured. Due to an inherent observability issue with the acceleration measurement, this embodiment approximates the state function and the function of displacement to provide an approximate optimal control.

In one embodiment, the approximate optimal control has a structure $$u = \begin{cases} b_{max}, & \hat{\varphi}(y, t)\hat{\eta} > 0, \\ b_{min}, & \text{otherwise,} \end{cases}$$

where $\hat{\eta}$ is the approximation of the function of displacement $\eta$ and $\hat{\varphi}$ is an approximation of $\varphi$ on the basis of measurements y. One variation of the embodiment uses the following approximate optimal control $$u = \begin{cases} b_{max}, & (c_1\hat{\dot{x}}_1 + c_2 y + \hat{x}_4)\hat{\eta} > 0, \\ b_{min}, & \text{otherwise,} \end{cases}$$

where $c_1$ and $c_2$ are, constant. The approximate optimal control of this embodiment approximates the acceleration of the elevator car and the virtual relative velocity between the ends of the virtual actuator.

Corresponding to FIG. 4, the approximation of the car acceleration is the output of the first filter 401, the approximation of the virtual relative velocity is the output of the second filter 402, and the approximation of the frame velocity is the output the third filter 403. The approximate control policy is evaluated in block 404.

Given the virtual system model expressed in Equation (1), treating the measured signal y as a known variable, and denoting the virtual relative position $\eta$, the dynamics of the virtual relative position can be derived as follows $$\dot{\eta} = -\frac{1}{b_2 + u}[k_2\eta + m_1\dot{x}_2 + m_2 y] \qquad (2)$$

where the car acceleration $\dot{x}_2$ can be estimated by the first filter $$\dot{\xi}_1 = \xi_2, \qquad (3)$$

$$\dot{\xi}_2 = -\frac{k_1}{m_1}\xi_1 - \frac{b_1}{m_1}\xi_2 + y,$$

$$\hat{\dot{x}}_2 = \frac{k_1}{m_1}\xi_1 + \frac{b_1}{m_1}\xi_2.$$

The first filter (3) processes the frame acceleration as its input, and outputs the estimation of the car acceleration. The output of the first filter (3), denoted by $\hat{\dot{x}}_2$, converges to the true value of the car acceleration $\dot{x}_2$. With the estimated car acceleration, the dynamics of the virtual relative position (2) is described by a linear time varying first order differential equation whose right hand side is a function of the virtual relative position, and known variables including the measured signal, and the estimated car acceleration.

The second filter estimates the virtual relative velocity of the virtual actuator according to $$\dot{\hat{\eta}} = -\frac{1}{b_2 + u}[k_2\hat{\eta} + m_1\hat{\dot{x}}_2 + m_2 y],$$

$$z = -\frac{1}{b_2 + u}[k_2\hat{\eta} + m_1\hat{\dot{x}}_2 + m_2 y],$$

where $\hat{\eta}$ is the estimation of the virtual relative position, and z denotes the estimation of the virtual relative velocity, or the approximation of the value of the function of displacement. The second filter provide asymptotic approximation of the function of displacement, i.e., the output of the second filter converges to the true value of the function of displacement as time goes infinity, and the convergent speed is exponential.

The filters disclosed herein provide a globally exponentially convergent estimation of the relative velocity and the car acceleration. This approach can be readily employed to estimate the relative velocity between the car and the frame, thus when the semi-active actuator is placed between the car and the frame, the disclosed control method is also applicable.

Exemplary Embodiment II

Figure 8:
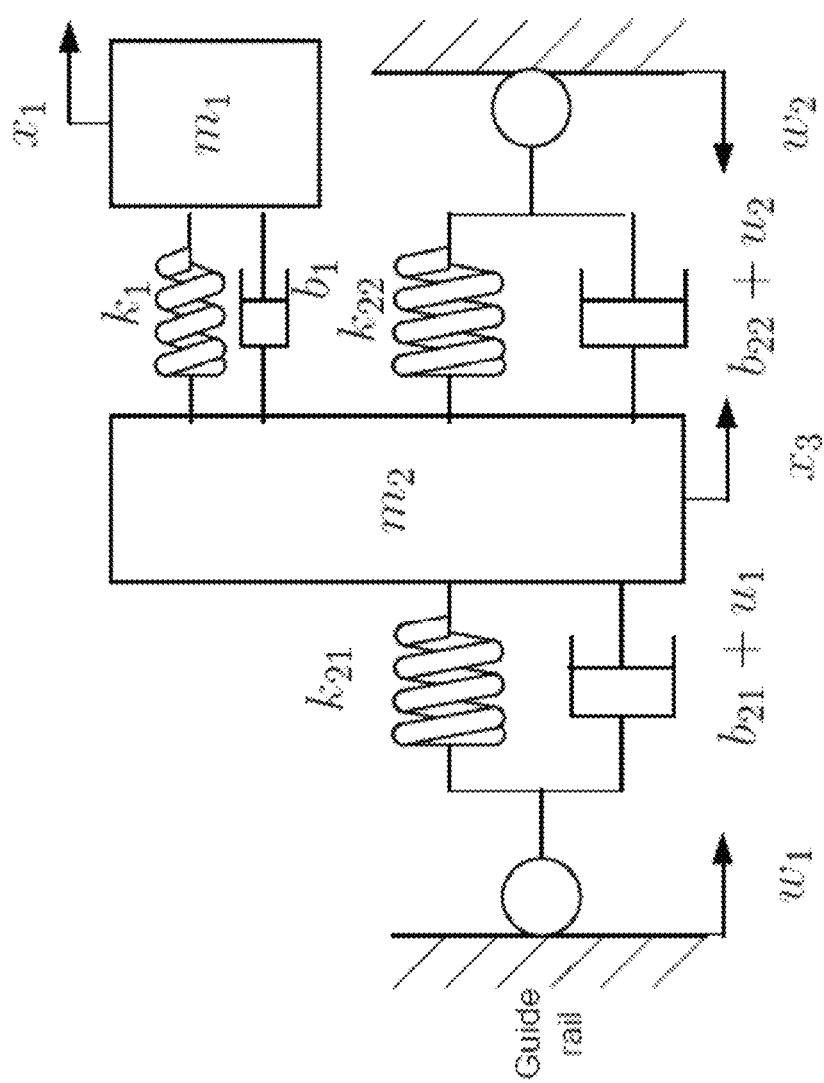
FIG. 8 is an exemplar model of a semi-active vibration reduction system subject to two external disturbances.

FIG. 8 shows a schematic of a portion of an elevator system subject to two external disturbances $w_1, w_2$ in the same direction. The system includes two semi-active actuators having, respectively, $u_1, u_2$ controlled damping coefficients, and $k_{21}$, $k_{22}$, $b_{21}$, $b_{22}$ are the stiffness and damping of supports between the frame and the guide rails. The disturbances act on the center of mass of the frame $m_2$, thus no frame rotation is incurred by external disturbances. The model of the disturbed mass-spring-damping system is $$m_1\ddot{x}_1 + k_1(x_1 - x_3) + b_1(\dot{x}_1 - \dot{x}_3) = 0, \quad (4)$$
$$m_2\ddot{x}_3 + k_1(x_3 - x_1) + b_1(\dot{x}_3 - \dot{x}_1) + k_{21}(x_3 - w_1) +$$
$$(b_{21} + u_1)(\dot{x}_3 - \dot{w}_1) + k_{22}(x_3 - w_2) + (b_{22} + u_2)(\dot{x}_3 - \dot{w}_2) = 0,$$
$$y = \ddot{x}_3,$$

where y is the frame acceleration measured by the sensors 103.

Next, the embodiment determines the virtual disturbance, and the damping coefficient of the virtual semi-active actuator to represent the system using a model of the virtual system. The forces generated by two semi-active actuators are $$f_1 = u_1(\dot{x}_4 - \dot{w}_1),$$

$$f_2 = u_2(\dot{x}_4 - \dot{w}_2).$$

With the assumption that the two semi-active actuators perform uniformly and the two semi-active actuators have same controlled damping coefficients, the combined compensating force resulting from the two semi-active actuators are $$f = 2u_1\left(\dot{x}_4 - \frac{\dot{w}_1 + \dot{w}_2}{2}\right).$$

Thus the virtual system has the model where the virtual disturbance is $$\bar{w} = \frac{w_1 + w_2}{2},$$

and the virtual semi-active actuator is mounted between the frame mass and a source of the virtual disturbance, control damping coefficients of the virtual semi-active actuator is $u = 2u_1$.

Given the virtual system, and constraints on the virtual semi-active actuator, and applying the optimal control theory, this embodiment uses the control policy of the virtual semi-active actuator having the following structure $$u = \begin{cases} 2b_{max}, & \varphi(x, y, t)\left[\dot{x}_4 - \frac{\dot{w}_1 + \dot{w}_2}{2}\right], \\ 2b_{min}, & \text{otherwise,} \end{cases}$$

where the function of displacement is the virtual relative velocity $$\dot{\eta} = \dot{x}_4 - \frac{\dot{w}_1 + \dot{w}_2}{2}.$$

Similar to the previous embodiment, this embodiment approximates the optimal control according to $$u = \begin{cases} 2b_{max}, & \hat{\varphi}(y, t)z, \\ 2b_{min}, & \text{otherwise,} \end{cases}$$

where $\hat{\varphi}$ approximates the state function $\varphi$ as a function of measured signals, and z approximates the second function. For example, in one variation of this embodiment, is $\hat{\varphi}$ is $c_1$ $\ddot{x}_1 + c_2 y + \hat{x}_4$ where $\hat{x}_4$ is an estimation of $x_4$.

The first filter generates the approximate value of the car acceleration as described above. Therefore, car acceleration can be treated as a known variable. Based on the model of the virtual system, treating the frame and car accelerations as known variables, and treating the virtual relative position $$\eta = x_3 - \bar{w},$$

as an independent variable, the dynamics of the virtual relative velocity can not be written as a set of state function of virtual relative position and known variables. Thus, the embodiment impose the symmetry condition on the system, according to $$\frac{k_{21}}{k_{22}} = \frac{b_{21}}{b'_{22}}.$$

Thus the virtual system model is rewritten as $$m_1\ddot{x}_1 + k_1(x_1 - x_3) + b_1(\dot{x}_1 - \dot{x}_3) = 0, \quad (5)$$
$$m_1\ddot{x}_1 + m_2\ddot{x}_3 + (k_{21} + k_{22})\left[x_3 - \frac{w_1 + w_2}{2}\right] +$$
$$(b_{21} + b_{22} + 2u)\left[\dot{x}_3 - \frac{\dot{w}_1 + \dot{w}_2}{2}\right] = 0.$$

The symmetry condition can be satisfied by some systems. For example, in the elevator case, the symmetry condition $k_{21} = k_{22}$, $b_{21} = b_{22}$ is satisfied.

Based on the virtual system model represented by Equation (5), and treating the frame and car accelerations as known variables, the dynamics of the virtual relative position $\eta$ can be derived as follows $$m_1\ddot{x}_1 + m_2\ddot{x}_3 + (k_{21} + k_{22})\eta + (b_{21} + b_{22} + 2u)\dot{\eta} = 0, \quad (6)$$

where the car acceleration, i.e., the second derivative $\ddot{x}_1$, can be reconstructed as in the embodiment I, and thus, can be treated as a known variable.

Hence, the dynamics of the virtual relative position is described as a linear time varying state equation whose right hand side is a function of the virtual relative position, and known variables including frame and car accelerations, and the designed virtual control signal. Because the frame acceleration is measured, the car acceleration can be estimated, and the designed virtual control signal is known, the dynamics of the virtual relative position is a known function thus the second filter can be designed to provide the approximate value of the virtual relative velocity.

According to the dynamics of the virtual relative position (6), the virtual relative velocity $\dot{\eta}$ can be reconstructed by the following second filter $$\dot{\hat{\eta}} = -\frac{-1}{\bar{b}_2 + 2u}\left(\bar{k}_2\hat{\eta} + m_1\hat{\ddot{x}}_1 + m_2 y\right), \hat{\eta}(0) = 0,$$

$$z = -\frac{-1}{\bar{b}_2 + 2u}\left(\bar{k}_2\hat{\eta} + m_1\hat{\ddot{x}}_1 + m_2 y\right),$$

where $\hat{\eta}$ and $\hat{\dot{\eta}}$ are the estimate of $\eta$ and its time derivative, respectively, $\hat{\ddot{x}}_1$ is the estimate of the car acceleration, z is the estimate of the virtual relative velocity, and $\bar{w}$, $\bar{k}_2$, $\bar{b}_2$ are the weighted disturbance, stiffness, and damping as follows $\bar{k}_2 = k_{21} + k_{22},$ $\bar{b}_2 = +b_{21} + b_{22}.$ Given the model of the physical system as in Equation (4), the application of optimal control theory gives the structure of the optimal control policy of the semi-active suspension to reduce multiple disturbances according to $$u_1 = \begin{cases} b_{max}, & \varphi_1(x, y, t)(\dot{x}_3 - \dot{w}_1) > 0, \\ b_{min}, & \text{otherwise,} \end{cases} \quad (7)$$

$$u_2 = \begin{cases} b_{max}, & \varphi_2(x, y, t)(\dot{x}_3 - \dot{w}_2) > 0, \\ b_{min}, & \text{otherwise.} \end{cases}$$

Such an optimal control policy requires the knowledge of $\dot{x}_3 - \dot{w}_1$ and $\dot{x}_3 - \dot{w}_2$. The values $x_3 - w_1$ and $x_3 - w_2$ cannot be estimated from the frame acceleration $\ddot{x}_3$ due to the presence of multiple disturbances in one direction. That is, equation (7) is not realizable only if $x_3 - w_1$ and $x_3 - w_2$ are directly measured.

The above analysis reveals that by exploiting the symmetry of the physical system, the disturbances fed through rollers in the left and right sides can be merged into one weighted disturbance, and the effect of multiple semi-active actuators can be simulated by a virtual semi-active actuator.

Control Methods for the Elevator

Figure 9:
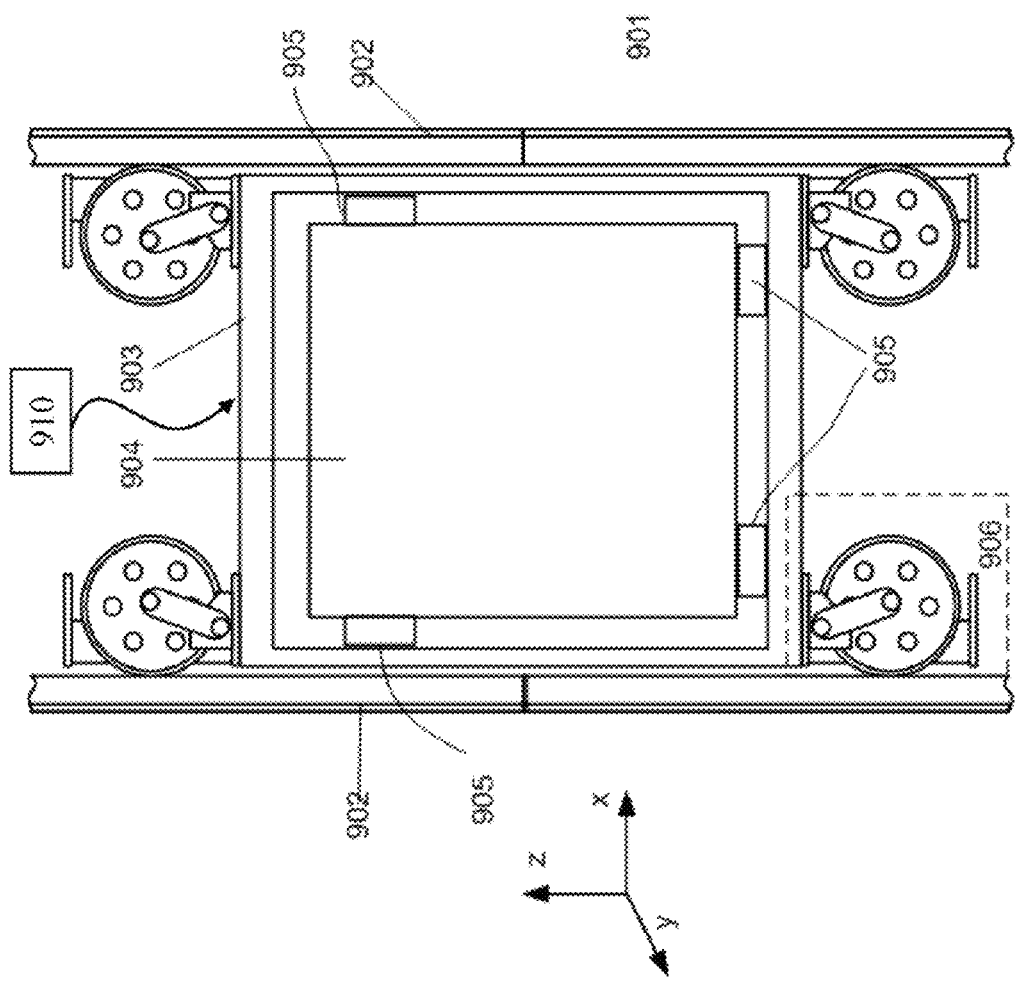
FIG. 9 is a schematic of an elevator system according to some embodiments of the invention.

FIG. 9 shows an example of a portion of an elevator system including two guide rails 902, a frame 903, a car 904, four car support rubbers 905, and four roller guides 906. In this no limiting example, each roller guide includes three rollers (center roller, front roller, and back roller), and three rotation arms corresponding to three rollers, and the elevator system includes four center, front, and back rollers respectively. The guide rails 902 are installed vertically (z-axis) in an elevator hoistway 901. The frame 903 supports the car 904 via the vibration isolating rubbers 905. The frame can move vertically in the hoistway of the elevator shaft. A roller guide 906 guides the movement of the frame 903 along guide rails 902 and includes three rollers 1001.

Figure 10:
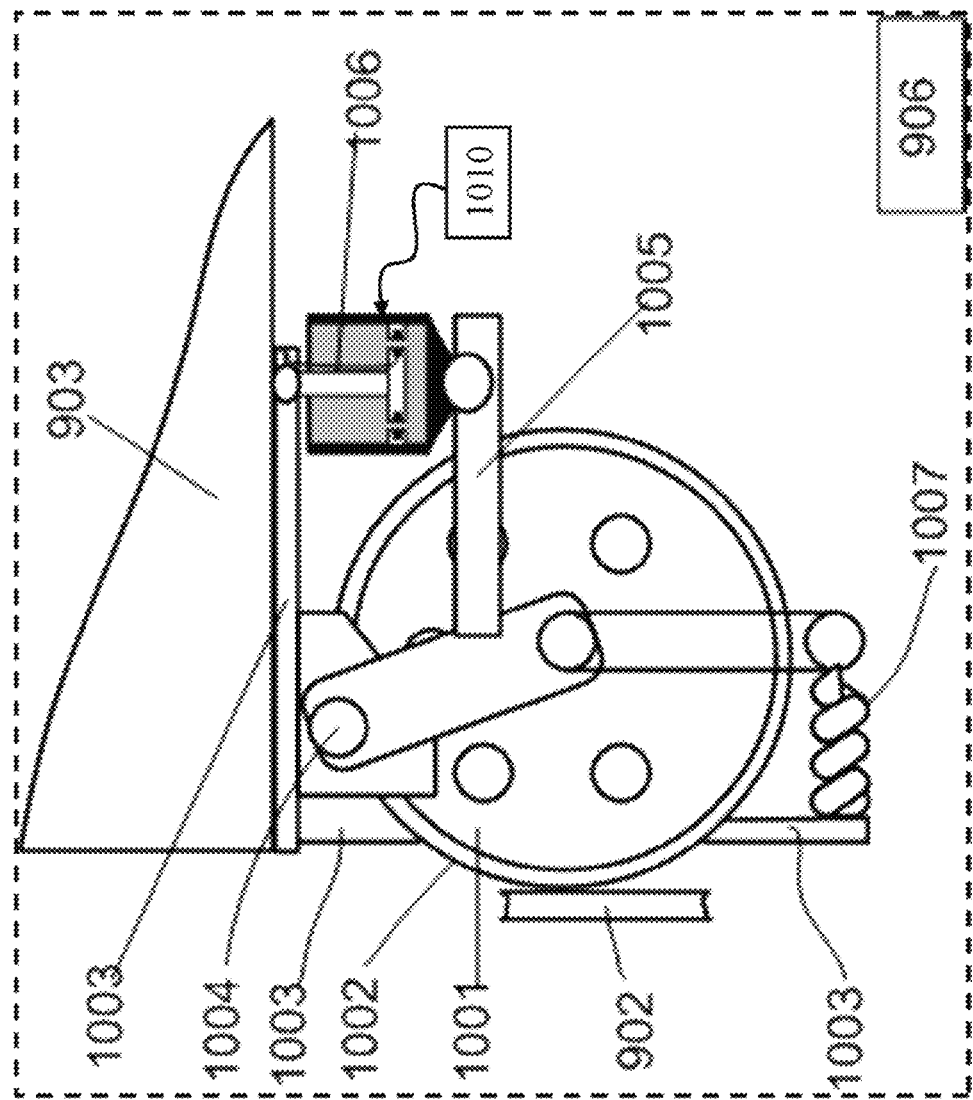
FIG. 10 is a schematic of a roller guide assembly with a semi-active actuator installed on a center roller according to some embodiments of the invention.

FIG. 10 shows a part of a roller guide assembly 906 with a center roller. The center roller is to reduce the vibration of the elevator car in the right-to-left direction. As shown in FIG. 10, the center roller 1001 maintains contact with the guide rail 902 through a roller gum 1002. The roller is mounted on a base 1003 of the frame, and can rotate around a pivot 1004 whose axis is either in a left to right direction, or a front to back direction. A rotation arm 1005 rotates at the same velocity as the roller around the pivot 1004. In one embodiment, a semi-active actuator 1006 is installed between the frame base 1003 and the rotation arm 1005. A roller spring 1007 is installed between the rotation arm 1005 and the frame base 1003.

As shown in FIG. 9, the level variation of guide rails causes the rotation of the roller around the pivot. The rotation of the roller induces the lateral movement of the frame, i.e. the level variation of guide rails is a source of the disturbances. The elevator car moves in either front to back (y-axis) and/or left to right (x-axis) directions. Damping between the roller and the frame, or the frame and the car, can achieve control of the car lateral vibration.

A semi-active actuator is installed between one end of the rotation arm and the base. The semi-active actuator generates a force based on a relative lateral movement between the rotation arm and the frame. This force can reduce the energy transferred to the frame, and thus damp the vibration of the frame. Consequently, the vibration of the elevator car is reduced.

According to various embodiments of the invention, the elevator system also includes a sensor 910 for measuring a parameter representing a vibration level of the elevator car during the operation of the elevator system. For example, an acceleration of the elevator car reflects the ride comfort that passengers feel, thus the sensor 910 can be an accelerometer for measuring an acceleration of the elevator frame 903 or for measuring directly the acceleration of the elevator car 904. In some embodiments, the semi-active actuators 1006 are controlled, e.g., by a controller 1010, according to the control policy based on the measured signal including values of the parameter measured during the operation of the elevator system, e.g., values of the acceleration of the elevator car. In one embodiment, the measured signal is the only signal measured for the controlling the actuators due to approximation of the control policy using the virtual system discussed above. Thus, in this embodiment, the number of sensor required for such control is reduced.

Also, in some embodiments, the displacement between ends of the semi-active actuator is approximated as a function of the measured parameter. Thus, in addition to minimizing a number of sensors, some embodiments improve the performance of controlled semi-active suspension systems, because the control policy based on such displacement is advantageous. For example, in one embodiment, the control policy includes a function of displacement representing displacement or relative velocity between ends of the virtual semi-active actuator. The function of displacement is approximated as the second function of the parameter.

In one embodiment, the roller guide assembly includes a linear/rotary rheological actuator arranged between the base and the rotation arm as shown in FIG. 10. The rheological actuator can include a magneto-rheological (MR) fluid, or an electro-rheological (ER) fluid. Generally, flow characteristics of the rheological fluid can be actuated by either a magnetic or electrical signal. Due to the linear relative velocity between the frame and the end point of the rotation arm, the frame vibration is reduced by selectively adjusting the damping coefficient of the linear MR actuator according to the feedback signal. In another embodiment, a friction actuator can be mounted to the roller guide assembly.

In the case of the MR actuator, the controller can selectively turn the MR actuators ON or OFF in response to the vibrations, and output the corresponding signal to the amplifier. To turn the MR actuator ON, the amplifier outputs an electric current to the coil of the MR actuator. The coil current establishes the required magnetic field to increase the viscosity of MR fluids inside the housing of the MR actuator, thus change the damping coefficient of the MR actuator. To turn the MR actuator OFF, no current is output by the amplifier, thus the damping coefficient of the MR actuator is minimal.

There are numerous variations of design and structures of the semi-active suspension of the elevator system. In one embodiment, one semi-active actuator is installed for each roller. Because there are twelve rollers, this embodiment requires twelve semi-active actuators. Considering the purpose of the semi-active suspension to reduce the floor acceleration, the semi-active actuators installed on the lower roller guide assembly play major impact on the achievable vibration reduction performance. Hence, another embodiment uses six semi-active actuators over the two lower roller guides. Further reduction of the number of semi-active actuators is possible. For example, one embodiment installs only four semi-active actuators, two over the lower center rollers in left-to-right direction, one over the lower left front roller, and one over the lower right front roller.

In one embodiment satisfying the aforementioned symmetry condition, the elevator suspension includes eight semi-active actuators, i.e., one semi-active actuator is installed on the center roller of each guide, and one semi-active actuator is installed on the front roller of each guide.

For example, one embodiment is directed to the control method of the semi-active scheme for the full elevator system, where six semi-active actuators are installed on two lower roller guides, i.e., one semi-active actuator for each lower roller. An example of the configuration of the semi-active actuator on a roller of an elevator is shown in FIG. 10. According to the model of the elevator system, both the car and frame have six degree of freedom, i.e., translational and rotational movements along x, y, z axes. Some notations used in this disclosure are given in Table 1.

TABLE 1

Notations

| Notation | Description |
| --- | --- |
| x-axis | right to left movement |
| y-axis | back and forth movement |
| z-axis | vertical movement |
| $x_c, x_f$ | x-axis movement of the car and the frame |
| $\theta_c^y, \theta_f^y$ | y-axis rotation of the car and the frame |
| $\theta_r^{yi}$ | y-axis rotation of the ith rotation arm |
| $m_c, m_f$ | the masses of the car and the frame |
| $I_c^y, I_f^y$ | the inertia of the car and the frame around the y-axis |
| $k_c^x$ | weighted stiffness of car-hold rubber (right to left direction) |
| $b_c^x$ | weighted damping of car hold rubber (right to left direction) |
| $k_g^x$ | the stiffness of a roller gum (right to left direction.) |
| $b_g^x$ | the damping coefficient of a roller gum (right to left direction) |
| $l_c^y$ | Vertical displacement between the force $f_c^x$ and the mass center of the car |
| L | length between arm pivot and actuator force point |
| $R_1$ | height between arm pivot and the point where the roller contacts the rail |
| $h_1$ | height between arm pivot and the roller spring |
| $l_f^{yi}$ | height between the frame center of mass and the point where the ith roller contacts the rail |
| $w_i^x$ | the disturbance applied on the ith roller in x-axis |
| $u_i^x$ | the damping coefficient of the actuator installed on the ith roller |

The car and frame movement in the right-to-left direction or in x-axis, and the car and frame movement in the back-to-forth direction or in y-axis are decoupled.

One embodiment considers the control method for semi-active actuators to reduce the vibration of the elevator in the right-to-left direction.

Figure 11:
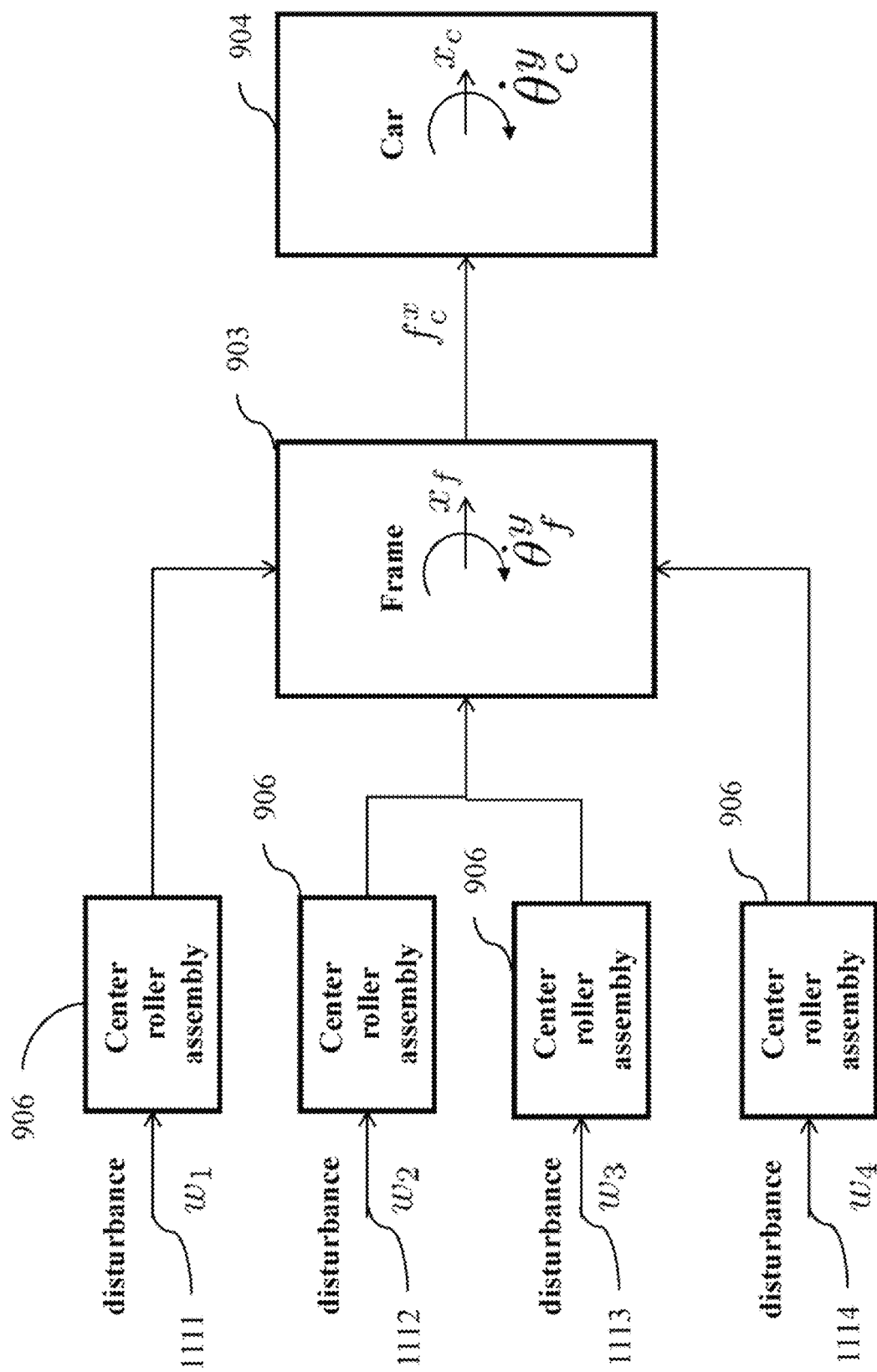
FIG. 11 is a schematic of disturbances of the elevator system of FIG. 9.

FIG. 11 shows a schematic of exemplar disturbances of the elevator system. In this example, the elevator system is subject to four disturbances, 1111, 1112, 1113, and 1114, in the right to left direction. The four disturbances are applied to the elevator system through the four center roller assembly 906, and excite the translational movement of frame 903 in the right to left direction, and the rotation of the frame around the y-axis. The translation and rotation of the frame further excite the translation and rotation of the car 904 in the right-to-left direction and around the y-axis respectively. The right-to-left movement of the car and the frame are coupled with the rotation of the car and the frame around the y-axis. This embodiment gives the dynamics of movements of the car and the frame in the x-axis, the rotations of the car and the frame around y-axis, and the rotation of the four center rollers. The rest of dynamics can be similarly derived but are irrelevant to reduce the vibration in the right-to-left direction.

The control method can be implemented by the controller 1010 based on the parameter representing an acceleration of the elevator car measured by the sensor 910. The controller controls the set of semi-active actuators according to an optimal control policy of a virtual semi-active actuator representing the set of actuators, as discussed above.

The elevator car can be subject to various forces result from the interaction with the frame. These forces can include the spring and damping forces resulting from support rubbers between the car and the frame, which is denoted by a lumped force $f_c^x$, and written as $$f_c^x = k_c^x(x_c - x_f + l_c^y(\theta_c^y - \theta_f^y)) + b_c^x(\dot{x}_c - \dot{x}_f + l_c^y(\dot{\theta}_c^y - \dot{\theta}_f^y)).$$

Similarly, the rotation of the car around the y-axis is induced by the lumped torque, corresponding to the lumped force $f_c^x$, denoted by $$T_c^x = l_c^y f_c^x.$$

The translational movement of the frame including the frame and all roller guides in x-axis is subject to the forces from its interaction with the car and the guide rails, all of which are type of spring and damping forces. The lumped spring and compensating force result from the roller gums of four center rollers is denoted by $f_g^x$ and written as $$f_g^x = \sum_{i=1}^{4} f_g^{xi},$$

$$f_g^{xi} = k_g^x(x_f + R_1\theta_r^{yi} + l_f^{yi}\theta_f^y - w_i^x) + b_g^x(\dot{x}_f + R_1\dot{\theta}_r^{yi} + l_f^{yi}\dot{\theta}_f^y - \dot{w}_i^x),$$

where $f_g^{xi}$ represents the spring and damping forces result from the roller gum of the ith center roller. Hence the dynamics of the translation of the frame in the right-to-left direction is $$(m_f + m_r)\ddot{x}_f + \sum_{i=1}^{4} p_2^{xi}\theta_r^{yi} - f_c^x + f_g^x = 0,$$

where $p_2^{xi}$ are constant.

The roller is subject to the torque corresponding to forces result from the interaction of the roller gum and the guide rail which is denoted by $$T_g^x = \sum_{i=1}^{4} T_g^{xi},$$

$$T_g^{xi} = R_1 f_g^{xi}.$$

The torque, around the pivot arms, corresponding to the spring and damping forces of the roller spring, is denoted by $$T_r^x = \sum_{i=1}^{4} T_r^{xi},$$

$$T_r^{xi} = h_1(k_r^x h_1 \theta_r^{yi} + b_r^x h_1 \dot{\theta}_r^{yi}).$$

The torque corresponding to the compensating force of semi-active actuators is $$T_u^x = \sum_{i=1}^{4} T_u^{xi},$$

$$T_u^{xi} = L^2 u_i^x \dot{\theta}_r^{yi}.$$

The dynamics of the elevator including the translation and rotation of the car and the frame in the right-to-left direction, and the rotation of the center rollers around their pivots are $$m_c \ddot{x}_c + f_c^x = 0, \tag{8}$$

$$I_c^y \ddot{\theta}_c^y + T_c^x = 0, \tag{9}$$

$$(m_f + m_r)\ddot{x}_f + \sum_{i=1}^{4} p_2^{xi} \ddot{\theta}_r^{yi} - f_c^x + f_g^x = 0, \tag{10}$$

$$p_2^{xi} \ddot{x}_f + p_3^{xi} \ddot{\theta}_f^y + I_r^y \ddot{\theta}_r^{yi} + T_g^{xi} + T_r^{xi} + T_u^{xi} = 0, 1 \le i \le 4, \tag{11}$$

wherein $p_3^{xi}$ are constant, and $I_r^y$ is the inertial of the rotation arm and center roller with respect to the pivot.

In one embodiment, the coupling terms $p_2^{xi}\ddot{\theta}_r^{yi}$ and $p_2^{xi}\ddot{x}_f$ are ignored because the rest of terms in the dynamics is dominant. Thus, the physical system model represented by Equations (8)-(10) can be simplified by considering $p_2^{xi}=0$, $p_3^{xi}=0$.

The virtual system is determined by manipulating the dynamics of the physical system. With the assumption that all semi-active actuator perform uniformly, the summation of Equation (11) for $1 \le i \le 4$ is $$I_r^y \sum_{i=1}^{4} \ddot{\theta}_r^{yi} + T_g^x + T_r^x + T_u^x = 0, \tag{12}$$

which allows the definition of a virtual semi-active actuator with a damping coefficient $$u = \frac{1}{4} \sum_{i=1}^{4} u_i^x = u_i^x,$$

and a corresponding virtual relative velocity $$\dot{\theta}_r^y = \sum_{i=1}^{4} \dot{\theta}_r^{yi}.$$

Thus, the virtual system is derived.

Based on the virtual system model, constraints on the virtual semi-active actuator, and the optimal control theory, the embodiments determines the optimal control policy for reducing the vibration of the elevator's car in the right-to-left direction as $$u^x = \begin{cases} b_{max}, & \varphi(x, y, t)\dot{\theta}_r^y > 0, \\ b_{min}, & \text{otherwise}. \end{cases}$$

A control method for the disclosed semi-active suspension of the elevator uses the approximation of the state function φ(x,y,t) of state and costate of the system and the function of displacement $\theta_r^y$ or the virtual relative velocity.

Some embodiments approximate the values of the state function and the function of displacement in the optimal control policy. The approximation of these functions is dependent on the measurement scheme. Particularly, the approximation of the function of displacement is also related to the configuration of the semi-active actuators.

Figure 12:
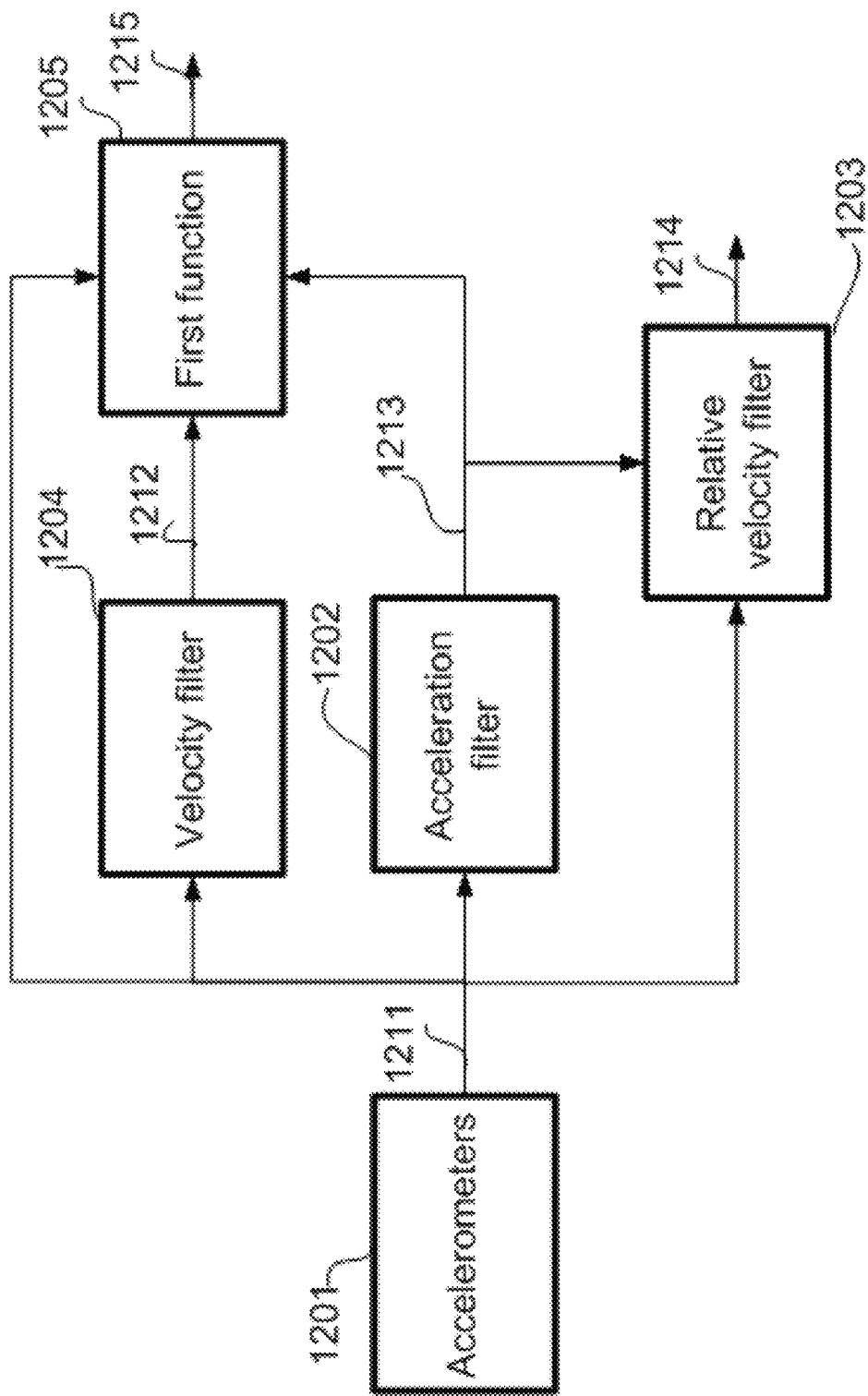
FIG. 12 is a block diagram of an estimator of FIG. 6 configured for the elevator system of FIG. 9.

FIG. 12 shows a block diagram of the estimator 601 which outputs the approximation of the state function and the function of displacement in the optimal control policy based only on the measured signal 1211 representing the acceleration of the elevator frame measured by accelerometer 1201. Similarly, to the estimator described in FIG. 4, the estimator of elevator system includes an acceleration filter 1202, a virtual relative velocity filter 1203, and a velocity filter 1204.

The acceleration filter estimates the translational acceleration of the elevator car based on the accelerations 1211 of the frame measured by an accelerometer 1201, the virtual relative velocity filter estimates the virtual relative velocity based on the estimated acceleration of the elevator car, e.g., translational accelerations, and the measured acceleration of the elevator frame, e.g., translational accelerations, and the velocity filter outputs the estimation of the translational velocity of the elevator frame based on the accelerations.

In one embodiment, four semi-active actuators are installed on all four center rollers to reduce the vibration in the x-axis. This embodiment designs the second filter on the basis of the virtual system. Assuming that the semi-active actuators perform the same action, the model of the virtual relative position, denoted by $$\eta = \sum_{i=1}^{4} \theta_r^{yi},$$

is given by $$T_g^x + I_r^y \ddot{\eta} + (h_1^3 b_r^x + L^2 u^x)\dot{\eta} + h_1^2 k_r^x \eta = 0, \tag{13}$$

where $u^x = u_i^x$ for $1 \leq i \leq 4$ is the control. The dynamics of the virtual relative position is represented a linear time varying differential equation whose right hand side is a function of the virtual relative position, the virtual relative velocity, the virtual control, and the torque from the roller gum $T_g^x$. Given the known variable, the displacement filter is $$\dot{\eta}_1 = \eta_2,$$
$$\dot{\eta}_2 = -\frac{1}{I_r^y}[(L^2 u^y + h_1^2 b_1)\eta_2 + h_1^2 k_1 \eta_1] - \frac{1}{I_r^y}T_g^x,$$
$$z = \eta_2,$$

wherein $I_r^y$ is an inertial of a rotation arm with respect to a pivot, L is a length between the pivot and an actuator force point, $u^y$ is a viscous damping coefficient of the virtual semi-active actuator, $h_1$ is a height between the pivot and a roller spring, $b_1$ is a damping coefficient of the roller spring, $k_1$ is a stiffness of the roller spring, and $T_g^x$ represents a torque around the pivot. The output of the second filter z approximates the virtual relative velocity $\dot{\theta}_r^y$. The approximate value of the virtual relative velocity z converges exponentially to the true value of the virtual relative velocity $\dot{\theta}_r^y$.

In another embodiment, only two semi-active actuators are installed on two out of four center rollers to reduce the vibration in the x-axis. This embodiment designs the second filter on the basis of the virtual system, and the second filter is similar to the filter of the previous embodiment.

The value of $T_g^x$ can be obtained by using the output of the first filter. For example, one embodiment assumes that translational and angular accelerations of the frame are measured. The car dynamics in Equations (8)-(9) are rearranged to estimate the car accelerations from the measured frame accelerations $$m_c\ddot{x}_c + k_c^x(x_c + l_c^y\theta_c^y) + b_c^x(\dot{x}_c + l_c^y\dot{\theta}_c^y) = k_c^x(x_f + l_c^y\theta_f^y) + b_c^x(\dot{x}_f + l_c^y\dot{\theta}_f^y),$$

$$l_c^y\ddot{\theta}_c^y + l_c^y k_c^x(x_c + l_c^y\theta_c^y) + l_c^y b_c^x(\dot{x}_c + l_c^y\dot{\theta}_c^y) = (l_c^y k_c^x(x_f + l_c^y\theta_f^y) + l_c^y b_c^x(\dot{x}_f + l_c^y\dot{\theta}_f^y). \quad (14)$$

The Laplace transformation of Equation (14) is $$(M_c s^2 + B_c s + K_c)X_c(s) = (B_c s + K_c)X_f(s),$$

where $X_c(s) = [x_c(s), \theta_c^y(s)]$ is the Laplace transformation of $[x_c, \theta_c^y]$, and $X_f(s) = [x_f(s), \theta_f^y(s)]$ is the Laplace transformation of $[x_f, \theta_f^y]$, and $M_c$, $B_c$, $K_c$ are appropriate matrices. The car accelerations can be estimated by filtering the frame accelerations through the following first filter whose transfer function is given by $$G_c(s) = (M_c s^2 + B_c s + K_c)^{-1}(B_c s + K_c).$$

According to the estimation of the car accelerations, the value of the lumped force $f_c^x$ is known. Thus the value of the lumped force from the roller gum $f_g^x$ can be computed according to (10), which implies the value of the torque $T_g^x$. Hence, the right hand side of the differential equation (13), which describes the dynamics of the virtual relative position, is a function of the virtual relative position, virtual relative velocity, and known variables. Thus the dynamics of the virtual relative position is in the deterministic form as (1).

One embodiment further simplifies the estimation of the value of the torque $T_g^x$. This embodiment only measures the translational acceleration of the frame, e.g., in right-to-left direction. As disclosed above, the estimation of the acceleration of the elevator car in x-axis requires the knowledge of frame's translational acceleration in x axis and rotational acceleration around y axis. The rotational dynamics of the car and the frame can be decoupled from the translational dynamics, and Equation (14) is simplified as $$m_c\ddot{x}_c + k_c^x x_c + b_c^x \dot{x}_c = k_c^x x_f + b_c^x \dot{x}_f \quad (15)$$

From the dynamics of Equation (15), the car acceleration in x axis can be estimated as the output of the following first filter whose input is the frame acceleration in x axis $$G(s) = \frac{b_c^x s + k_c^x}{m_c s^2 + b_c^x s + k_c^x}.$$

The G(s) is the transfer function of the first filter whose input is translational acceleration of the elevator frame in, e.g., right to left direction, and the output is the translational acceleration of the elevator car in, e.g., right to left direction. Also, s is a complex frequency, $m_c$ is a mass of the elevator car, $k_c^x$ is a weighted stiffness of a car-hold dumper, and $b_c^x$ is a weighted damping of car-hold dumper. Given the estimated car acceleration, the value of the lumped force from the roller gum $f_g^x$ can be computed according to Equation (10), which implies the value of the torque $T_g^x$. The virtual relative velocity can be approximated by the same second filter. Accordingly, the vibration of the elevator car is reduced based only on the measurement of the acceleration.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. The method for controlling a set of semi-active actuators arranged in an elevator system to compensate a vibration of an elevator car caused by a set of disturbances during an operation of the elevator system, comprising:

determining, based on a model of the elevator system, a control policy for controlling the set of semi-active actuators, wherein the control policy includes a state function representing an operation of the elevator system and a function of displacement representing and operation of the set of semi-active actuators;

approximating, using the model of the elevator system, the state function as a first function of a parameter the vibration;

approximating, using the model of the elevator system, the function of displacement as a second function of the parameter, comprising:

representing the model of the elevator system as a model of a virtual system having disturbance, wherein a compensative force of the compensate a virtual disturbance, wherein a compensative force of the virtual semi-active actuator represents compensative forces of the set of semi-active actuators, and wherein the virtual disturbances represents a combination of the set of disturbances;

approximating the state function and the function of displacement based on the model of the virtual system;

representing disturbed dynamics of the function of displacement based on the model of the virtual system, the disturbed dynamics includes known variables corresponding to a measured signal and unknown variables; and transforming, using the model of the virtual system, the disturbed dynamics into deterministic dynamics independent of the unknown variables wherein the disturbed dynamics is $\dot{\chi}=F(\chi,y,\xi,u,\epsilon)$, and the deterministic dynamics is $\dot{\chi}=F(\chi,y,\xi,u)$, wherein F is a function, $\chi$ represents the function of displacement, $\dot{\chi}$ is a time derivative of the function of displacement, $\xi$ represents a signal estimated based on the measured signal, y represents the measured signal, u represents a control input for controlling the virtual semi-active actuator, u represents unknown variables of the disturbed dynamics, wherein $\xi$, y, and u are the known variables; and controlling the set of semi-active actuators in accordance with the control policy based on a measured signal of the parameter, wherein steps of the method are performed by a processor.

2. The method of claim 1, wherein the control policy is approximated as an approximated control policy of the virtual semi-active actuator, and wherein the controlling further comprises:

controlling uniformly each actuator of the set of semi-active actuators according to the approximated control policy of the virtual semi-active actuator.

3. The method of claim 1, wherein the transforming is based on a symmetry assumption.

4. The method of claim 1, wherein the transforming is based on a simplification of the disturbed dynamics according to components of the disturbed dynamics.

5. The method of claim 1, wherein the parameter is an acceleration of an elevator frame.

6. An elevator system, comprising:

an elevator car arranged in the elevator system for moving along an elevator shaft during an operation of the elevator system;

a sensor for measuring a parameter representing a vibration of the elevator car during the operation, the sensor produces a measured signal;

a set of semi-active actuators for compensating the vibration of the elevator car; and a controller for controlling uniformly the set of semi-active actuators according to a control signal determined based on the measured signal and a control policy of a virtual semi-active actuator, wherein a compensative force of the virtual semi-active actuator represents compensative forces of the set of semi-active actuators, wherein the parameter is an acceleration of an elevator frame, the controller further comprises:

an acceleration filter for determining an acceleration of the elevator car based on the acceleration of the elevator frame using a model of the elevator system, wherein the acceleration filter includes a transfer function as $$G(s) = \frac{b_c^x s + k_c^x}{m_c s^2 + b_c^x s + k_c^x},$$

wherein s is a complex frequency, $m_c$ is a mass of the elevator car, $k_c^x$ is a weighted stiffness of a car-hold dumper, and $b_c^x$ is a weighted damping of car-hold dumper, and a displacement filter for determining a function of displacement of the virtual semi-active actuator based on the acceleration of the elevator frame, the acceleration of the elevator car, and the model of the elevator system.

7. The elevator system of clam 6, wherein the control policy includes a function of displacement between ends of the virtual semi-active actuator approximated as a function of the parameter.

8. The control system of claim 6, wherein the displacement filter is $\dot{\eta}_1 = \eta_2$, $$\dot{\eta}_2 = -\frac{1}{I_r^y}[(L^2 u^y + h_1^2 b_1)\eta_2 + h_1^2 k_1 \eta_1] - \frac{1}{I_r^y} T_g^x,$$

$z = \eta_2,$ wherein $I_r^y$ is an inertial of a rotation arm with respect to a pivot, L is a length between the pivot and an actuator force point, $u^y$ is a viscous damping coefficient of the virtual semi-active actuator, $h_1$ is a height between the pivot and a roller spring, $b_1$ is a damping coefficient of the roller spring, $k_1$ is a stiffness of the roller spring, and $T_g^x$ represents a torque around the pivot.

9. A method for controlling a set of semi-active actuators arranged in a system to compensate a set of disturbances along a direction of disturbance, comprising:
representing the system as a model of a virtual system having a single virtual semi-active actuator arranged to compensate a virtual disturbance along the direction of disturbance, wherein a compensative force of the virtual semi-active actuator represents compensative forces of the set of semi-active actuators, and wherein the virtual disturbance represents a combination of the set of disturbances;
determining a control policy for controlling the set of semi-active actuators including a state function representing an operation of the system and a function of displacement representing an operation of the set of semi-active actuators;
approximating using the model of the virtual system, the state function as a first function of a parameter representing a vibration of the system and the function of displacement as a second function of the parameter to produce the control policy of the virtual semi-active actuator;
determining disturbed dynamics of the first function treated as an independent variable;
determining deterministic dynamics of the first function based on the disturbed dynamics of the first function and the model of the virtual system
determining disturbed dynamics of the second function treated as an independent variable;
determining deterministic dynamics of the second function based on the disturbed dynamics of the second function and the model of the virtual system
designing, based on the deterministic dynamics of the first function, a first filter approximating an unknown variable as a function of the parameter;
designing, based on the deterministic dynamics of the second function, a second filter approximating the function of displacement based on an output of the first filter and the parameter;
determining the second function as a combination of outputs of the first and the second filters; and
controlling each actuator of the set of semi-active actuators according to a control policy of the virtual semi-active actuator based on a measured signal including values of the parameter measured during an operation of the system, wherein steps of the method are performed by a processor.

10. The method of claim 9, wherein a result of the function of displacement includes a virtual velocity or a virtual displacement between a first and a second end of the virtual semi-actuator.

11. The method of claim 9, wherein the parameter is an acceleration of a mass of the system.

12. The method of claim 9, further comprising:
representing the first function as a linear combination of a function of velocity of a mass of the system, the parameter, and an unknown variable;
designing, based on the model, a first filter approximating the unknown variable as a function of the parameter;
designing, based on the model, a third filter approximating the function of velocity based on output of the first filter and the parameter; and
determining the first function based on a combination of outputs of the first and the third filters.

13. A method for controlling a set of semi-active actuators arranged in a system to compensate a set of disturbances along a direction of disturbance, comprising:
representing the system as a model of a virtual system having a single virtual semi-active actuator arranged to compensate a virtual disturbance along the direction of disturbance, wherein a compensative force of the virtual semi-active actuator represents compensative forces of the set of semi-active actuators, and wherein the virtual disturbances represents a combination of the set of disturbances;
determining a control policy for controlling the set of semi-active actuators including a state function representing an operation of the system and a function of displacement representing an operation of the set of semi-active actuators;
approximating using the model of the virtual system, the state function as a first function of a parameter representing a vibration of the system and the function of displacement as a second function of the parameter to produce the control policy of the virtual semi-active actuator;
representing the first function as a linear combination of a function of velocity of a mass of the system, the parameter, and an unknown variable;
designing, based on the model, a first filter approximating the unknown variable as a function of the parameter;
designing, based on the model, a third filter approximating the function of velocity based on output of the first filter and the parameter; and
determining the first function based on a combination of outputs of the first and the third filters; and
controlling each actuator of the set of semi-active actuators according to a control policy of the virtual semi-active actuator based on a measured signal including values of the parameter measured during an operation of the system, wherein steps of the method are performed by a processor.

* * * * *